US012128535B2

(12) United States Patent
Huang et al.

(10) Patent No.: US 12,128,535 B2
(45) Date of Patent: Oct. 29, 2024

(54) FORCE SUPPLY MECHANISMS AND NAIL GUNS HAVING SAME

(71) Applicant: TAIZHOU DAJIANG IND. CO. LTD., Wenling (CN)

(72) Inventors: Jinquan Huang, Wenling (CN); Mingjun Yang, Wenling (CN); Tao Yang, Wenling (CN); Huijin Yang, Wenling (CN)

(73) Assignee: TAIZHOU DAJIANG IND. CO. LTD., Wenling (CN)

( * ) Notice: Subject to any disclaimer, the term of this patent is extended or adjusted under 35 U.S.C. 154(b) by 0 days.

(21) Appl. No.: 18/208,354

(22) Filed: Jun. 12, 2023

(65) Prior Publication Data

US 2023/0405781 A1 Dec. 21, 2023

(30) Foreign Application Priority Data

Jun. 14, 2022 (CN) .......................... 202210672512.7
Jun. 14, 2022 (CN) .......................... 202210672513.1
Jun. 14, 2022 (CN) .......................... 202210672531.X
Jun. 14, 2022 (CN) .......................... 202210674330.3
Jun. 14, 2022 (CN) .......................... 202221499915.8
Jun. 14, 2022 (CN) .......................... 202221501041.5
Jun. 14, 2022 (CN) .......................... 202221501735.9
Jun. 14, 2022 (CN) .......................... 202221532341.X

(51) Int. Cl.
*B25C 1/04* (2006.01)

(52) U.S. Cl.
CPC .................................... *B25C 1/047* (2013.01)

(58) Field of Classification Search
CPC ....... B25C 1/047; B25C 1/06; B25B 23/0064; B25B 21/02; B25B 27/0085; B25B 21/023; B25B 21/00; B25B 21/002; B25B 23/045; B25B 23/06; B23P 19/06; B23B 31/12; B25F 5/02
See application file for complete search history.

(56) References Cited

U.S. PATENT DOCUMENTS 6,899,260 B2 * 5/2005 Sun .......................... B25C 1/06 74/49
6,997,367 B2 * 2/2006 Hu .......................... B25C 5/15 173/202
7,445,139 B2 * 11/2008 Okouchi .................. B25C 1/06 227/8

(Continued)

*Primary Examiner* — Nathaniel C Chukwurah
(74) *Attorney, Agent, or Firm* — Locke Lord LLP; Tim Tingkang Xia, Esq.

(57) ABSTRACT

The invention relates to a force supply mechanism and a nail gun having the same. The force supply mechanism includes a cylinder set inside the nail gun; a piston movably disposed in the cylinder; a nail striking member co-movably connected to the piston; and a spring unit disposed in the cylinder and located between the piston and the rear end cover of the cylinder and configured such that an engagement of the nail striking member with a driving member causes the piston to move backward in the cylinder to push the spring unit into a contract state to store energy therein, and an disengagement of the nail striking member with the driving member causes the spring unit to release the stored energy to push the piston to move forward in the cylinder so that the nail striking member is co-moved therewith to strike a nail out of a muzzle.

22 Claims, 12 Drawing Sheets

(56) References Cited

U.S. PATENT DOCUMENTS

| | | | | |
|---|---|---|---|---|
| 7,938,305 | B2 * | 5/2011 | Simonelli | B25C 1/06 227/129 |
| 10,442,066 | B2 * | 10/2019 | Nishikawa | B25C 7/00 |
| 11,141,849 | B2 * | 10/2021 | Ferris | B25C 5/15 |
| 2017/0129085 | A1 * | 5/2017 | Miyashita | B25C 5/15 |
| 2017/0217004 | A1 * | 8/2017 | Kato | B25C 5/15 |

* cited by examiner

FORCE SUPPLY MECHANISMS AND NAIL GUNS HAVING SAME

CROSS-REFERENCE TO RELATED PATENT APPLICATIONS

This application claims priority to and benefit of Chinese Patent Application Nos. 202221532341.X, 202210672512.7, 202210674330.3, 202221499915.8, 202210672531.X, 202221501735.9, 202210672513.1, and 202221501041.5, all filed Jun. 14, 2022, which are hereby incorporated by reference in their entireties.

FIELD OF THE INVENTION

This invention relates generally to nail guns, and more particularly to force supply mechanisms and nail guns having the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Nail guns are commonly used hand-held processing tools in the fields of construction and decoration. Conventionally, the nail guns are mostly pneumatic nail guns. A pneumatic nail gun generally utilizes compressed high pressure air in an air pressure chamber to actuate the striking pin to push a nail out of a nail muzzle and thus needs a source of the compressed air. Usually, the pneumatic nail gun is connected with auxiliary equipment such as an air compressor for providing compressed air to the air pressure chamber through a special air-line during operation. They are restricted by the air-line length when working, which is not convenient in certain circumstances.

Electrical nail guns are also available commercially, which operate using electrical energy. One type of the electrical nail guns is through the use of solenoid driven mechanisms in which the force provided by a solenoid is governed by the number of ampere-turns in the solenoid. In order to obtain the high forces required for driving nails into a work piece, a large number of turns are required in addition to high current pulses. These requirements are counterproductive as the resistance of the coil increases in direct proportion to the length of the wire in the solenoid windings. This type of the electrical nail guns limits most solenoid driven mechanisms to short stroke small load applications.

Therefore, a heretofore unaddressed need exists in the art to address the aforementioned deficiencies and inadequacies.

SUMMARY OF THE INVENTION

In one aspect, this invention relates to a force supply mechanism used for a nail gun, comprising: a cylinder set inside the nail gun, having a front end cover and a rear end cover; a piston movably disposed in the cylinder; a nail striking member co-movably connected to the piston such that the nail striking member operably moves backward and forward through the front end cover of the cylinder in a straight line; and a spring unit disposed in the cylinder and located between the piston and the rear end cover of the cylinder and configured such that an engagement of the nail striking member with a driving member causes the piston to move backward in the cylinder to push the spring unit into a contract state so as to store energy therein, and an disengagement of the nail striking member with the driving member causes the spring unit to release the stored energy therein to push the piston to move forward in the cylinder so that the nail striking member is co-moved therewith to strike a nail out of a muzzle.

In one embodiment, the spring unit comprises at least one variable pitch spring having at least one variable pitch section; and a pitch of the at least one variable pitch section is gradually increased or decreased.

In one embodiment, the at least one variable pitch spring further has at least one equidistant section connected to the at least one variable pitch section, and the pitches of the at least one equidistant section are the same.

In one embodiment, the spring unit comprises at least one variable pitch spring having at least two equidistant sections with different pitches and a transition section connecting two adjacent equidistant sections, and a pitch of the same equidistant section is same.

In one embodiment, the spring unit comprises at least two spring sets arranged in parallel and distributed symmetrically around a central extension line of the nail striking member, each spring set comprises at least one inner spring and an outer spring that sleeves the at least one inner spring inside, and a helical direction of an inner spring adjacent to the outer spring is opposite to that of the outer spring.

In one embodiment, each spring set comprises two or more inner springs with different diameters, and the inner springs and the outer spring are arranged coaxially, and helical directions of two adjacent inner springs are opposite.

In one embodiment, each spring set comprises a plurality of inner springs has a same diameter, and the plurality of inner springs are symmetrically arranged inside the outer spring.

In one embodiment, the spring unit comprises two or more spring parts arranged along a moving direction of the piston; and a linkage piece arranged between two adjacent spring parts for linking the two adjacent spring parts, each of the spring parts comprises at least one spring; at least one of the spring parts comprises a plurality of springs arranged in parallel and symmetrically distributed around a central extension line of the nail striking member; and all the springs are helical springs.

In one embodiment, helical directions of the springs in each spring part are the same; and the helical directions of the springs in the two adjacent spring parts are opposite.

In one embodiment, at least one of the springs is a variable pitch spring having at least one variable pitch section, or at least two equidistant sections with different pitches and a transition section connecting two adjacent equidistant sections.

In one embodiment, at least one of the spring parts comprises at least one spring set having at least one inner spring and an outer spring that sleeves the at least one inner spring inside; and a helical direction of an inner spring adjacent to the outer spring is opposite to that of the outer spring.

In one embodiment, each spring includes a plurality of sub-springs connected in series.

In one embodiment, each spring is formed of one or more twisted strands of metal materials.

In one embodiment, each spring is a cylindrical spring, a conical spring, a concave spring, or a convex spring.

In one embodiment, all the springs in each spring part are a same type of springs, and the springs in one of the two adjacent spring parts are a first type of springs and the springs in another of the two adjacent spring parts are a second type of springs that is different from the first type of springs.

In one embodiment, the first type of springs and the second type of springs are respectively composed of two different types of equidistant springs, variable pitch springs, and sleeve springs, and the sleeve spring has at least one inner spring and an outer spring that sleeves the at least one inner spring inside.

In one embodiment, the first type of springs and the second type of springs are respectively composed of two different types of cylindrical springs, conical springs, concave springs, and convex springs.

In one embodiment, the spring parts have a front spring part and a rear spring part respectively disposed in front and rear portions of the cylinder; the front spring part has a comprehensive elastic coefficient that is different from that of the rear spring part; a front buffer piece is provided between the piston and the front spring part for operably buffering vibrations of the front spring part; and a rear cushion member is provided between the rear spring part and the rear end cover of the cylinder for operably cushioning vibration of the rear spring part.

In one embodiment, the spring unit further comprises a plurality of guiding rods central-symmetrically arranged in the cylinder, wherein each guiding rod has a front end and a rear end that are respectively fixed onto the front end cover and the rear end cover of the cylinder; the piston is movably mounted on the plurality of guiding rods; and at least one of the spring parts comprises the force supply springs with the same number as the plurality of guiding rods, and each force supply spring is respectively arranged on a corresponding one of the plurality of guiding rods.

In one embodiment, the linkage piece includes a plurality of mounting parts movably arranged on the plurality of guiding rods and at least one guiding rod part; and one end of one spring part is mounted on the guide rod part, and the other end of said spring part is mounted on the rear end cover of the cylinder or the piston.

In another aspect, the invention relates to a nail gun for nailing, comprising a force supply mechanism as disclosed above; and a driving member being operably alternatively engaged and disengaged with the nail striking member of the force supply mechanism such that the engagement of the nail striking member with the driving member causes the piston to move backward in the cylinder to push the spring unit into a contract state so as to store energy therein, and the disengagement of the nail striking member with the driving member causes the spring unit to release the stored energy therein to push the piston to move forward in the cylinder so that the nail striking member is co-moved therewith to strike a nail out of a muzzle.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
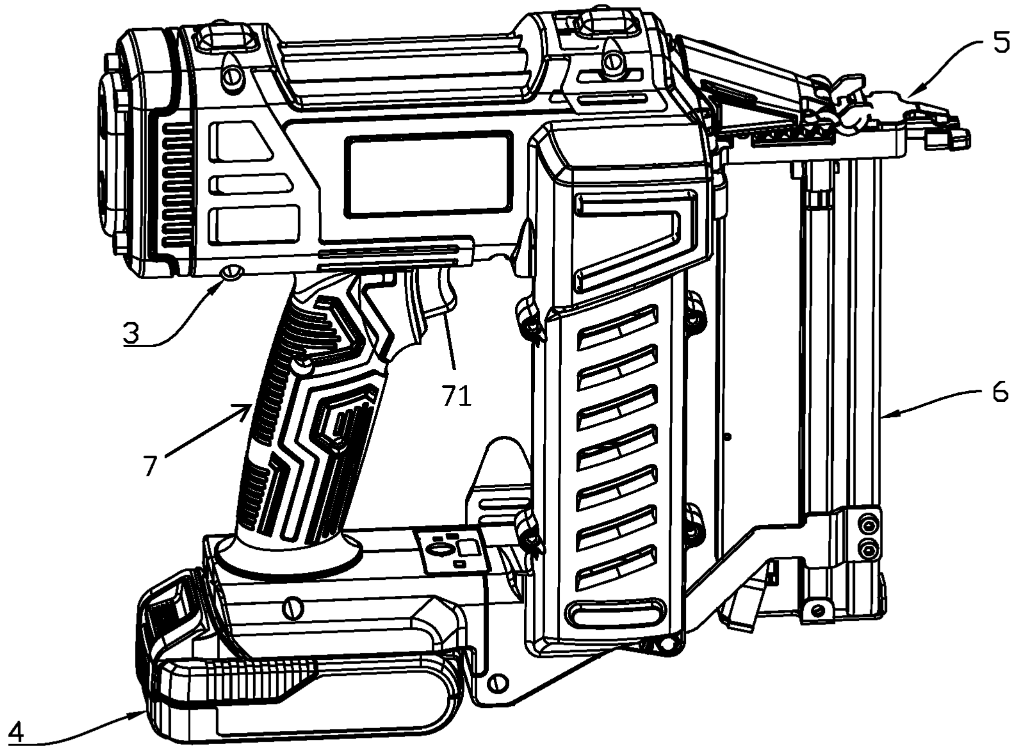
FIG. 1 is a schematic view of a nail gun according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims.

Whenever a range is given in the specification, for example, a temperature range, a time range, or a composition or concentration range, all intermediate ranges and subranges, as well as all individual values included in the ranges given are intended to be included in the invention. It will be understood that any subranges or individual values in a range or subrange that are included in the description herein can be excluded from the claims herein.

It will be understood that, as used in the description herein and throughout the claims that follow, the meaning of "a", "an", and "the" includes plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising", or "includes" and/or "including", or "has" and/or "having", or "carry" and/or "carrying", or "contain" and/or "containing", or "involve" and/or "involving", "characterized by", and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used in the disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in the disclosure, the phrase "at least one of A, B, and C" should be construed to mean a logical (A or B or C), using a non-exclusive logical OR. As used herein, the term "and/or" includes any and all combinations of one or more of the associated listed items.

As used herein the disclosure, the term "spring" or "force supply spring" refers to a resilient device, typically a helical/spiral metal coil, that stores energy in the helical coil when pressed from its initial shape into a compressed shape, and releases the stored energy when released to return to its initial shape, which can provide force/energy supply.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In accordance with the purposes of this invention, as embodied and broadly described herein, this invention, in certain aspects, relates to a force supply mechanism and a nail gun with the force supply mechanism. Embodiments of the invention are now described in conjunction with the accompanying drawings in FIGS. 1-22.

Referring to FIG. 1, a perspective view of a nail gun is schematically shown according to embodiments of the invention. The nail gun includes a gun nozzle 5, a nail magazine assembly 6, a driving device, a lithium battery module 4, e.g., a rechargeable lithium battery, and a housing/casing 3.

The gun nozzle 5 is provided with a firing channel, and has an ejection port for nail shooting. The nail magazine assembly 6 has a nail passing channel in which nails are installed. The firing channel of the gun nozzle 5 is in communication with the nail passing channel of the nail magazine assembly 6. The rear end of the gun nozzle 5 is provided with a driving device for firing the nails. The driving device is arranged in the housing 3. A handle 7 is extended from the rear of the housing 3. The lithium battery module 4 is installed at the lower end of the handle to provide power for the driving mechanism 2. A nail switch 71 for controlling the driving device is installed at the upper end of the handle 7.

Figure 2:
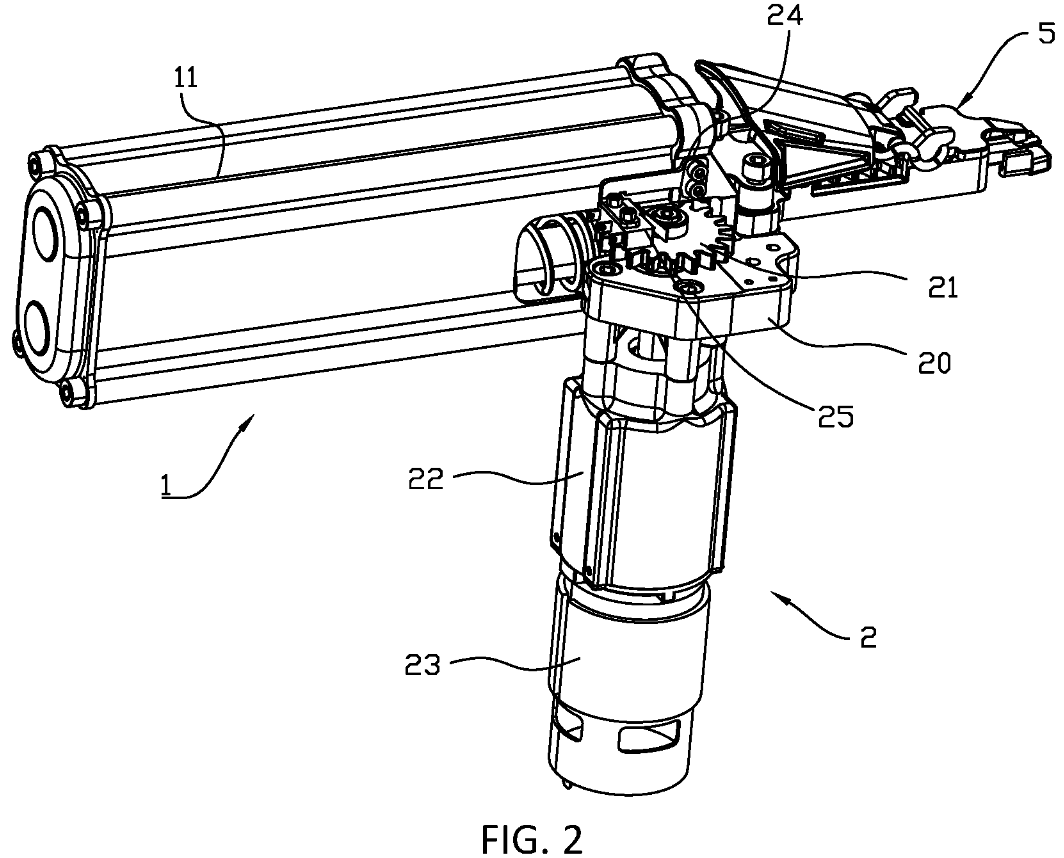
FIG. 2 is a schematic view of a force supply mechanism, a driving mechanism and a gun nozzle according to one embodiment of the invention.
Figure 3:
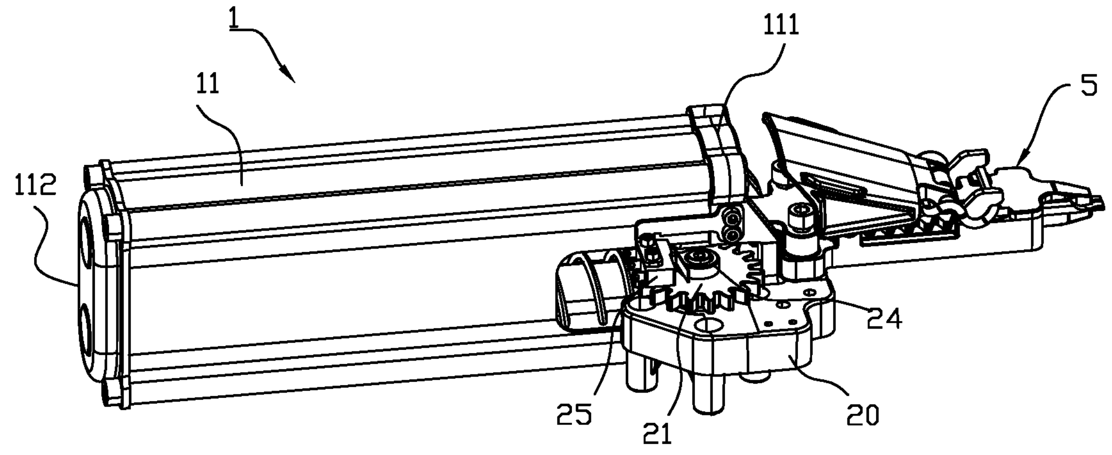
FIG. 3 is a schematic structural view of a force supply mechanism and a gun nozzle according to one embodiment of the invention.
Figure 4:
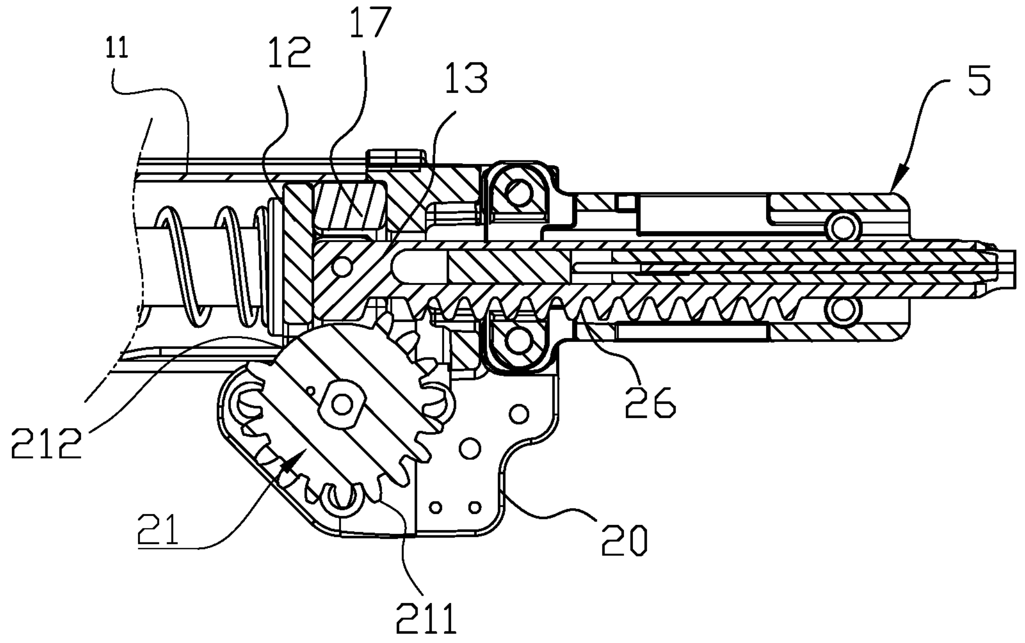
FIG. 4 shows schematically a partially cross-sectional view of a drive mechanism and a muzzle according to one embodiment of the invention.

FIG. 2 is a schematic structural diagram of the force supply mechanism 1, the driving mechanism 2 and the gun nozzle 5 of the nail gun according to embodiments of the invention. FIG. 3 is a schematic structural diagram of the force supply mechanism 1 and the gun nozzle 5 of the nail gun according to embodiments of the invention. FIG. 4 shows a partially cross-sectional view of the drive mechanism 2 and the nail muzzle 5 of the nail gun of the invention.

As shown in FIG. 2, the driving device includes the force supply mechanism 1 and the driving mechanism 2. The force supply mechanism 1 is arranged on the rear end of the gun nozzle 5, and is used to provide the power for striking the nail. The driving mechanism 2 is arranged on one side of the force supply mechanism 1, as an external device of the force supply mechanism 1, and is used to control the force supply mechanism 1 to strike the nails.

As shown in FIGS. 2-4, a driving platform 20 is integrally formed on one side of the front portion/side 111 of the cylinder 11. The driving mechanism 2 is disposed on the driving platform 20. The driving mechanism 2 includes a plurality of driving teeth 26 formed on one side of the nail striking member 13, a driving wheel (also known as notch gear or driving gear) 21 mounted on the driving platform 20, a gear reducer (also known as gearbox or speed reducer) 22, and a driving motor 23. The output end of the driving motor 23 is connected to the input end of the gear reducer 22, and the output end of the gear reducer 22 is provided with the driving wheel 21. The driving wheel 21 includes a tooth portion having teeth 211 that is operably meshed with the driving teeth 26 and a non-tooth portion 212 that is not meshed with the driving teeth 26.

For convenience of installation, the driving platform 20 is perpendicular to the working surface of the front portion/side 111. The driving motor 23 is mounted on the lower end surface of the driving platform 20 through the gear reducer 22, and the driving wheel 21 is mounted on the upper end surface of the driving platform 20. A cam 24 and a limit switch 25 are further arranged above the driving wheel 21, and the cam 24 and the driving wheel 21 rotate synchronously. In operation, when the convex portion of the cam 24 touches the limit switch 25, the limit switch 25 controls the driving motor 23 to stop rotating.

The lithium battery module 4 supplies power for the driving motor 23. The nail switch 71 is used to control the operation of the drive motor 23.

The driving teeth 26 are arranged on the side of the nail striking member 13 adjacent to the driving wheel 21 and intermesh with the teeth 211 of the driving wheel 21. The section length of all the driving teeth 26 is matched with the compression length of the spring unit, and the number of the teeth of the tooth portion 211 is matched with the number of teeth of all the driving teeth 26. In this embodiment, the tooth portion 211 is approximately ¾ of the circumference rim of the driving wheel 21 and the non-tooth portion 212 is approximately ¼ of the circumference rim of the driving wheel 21. In operation, the driving wheel 21 is rotated in 270°, and the nail striking member 13 is moved by the amount of movement that satisfies the compression of the spring unit to the nail firing position. When the tooth portion 211 engages with the driving teeth 26, the driving wheel 21 is engaged with the nail striking member 31, and the rotation of the driving wheel 21 can drive the nail striking member 13 to move. When the non-tooth portion 212 faces the nail striking member 13, that is, the tooth portion 211 does not engage with the driving tooth 26, the driving wheel 21 is disengaged with the nail striking member 31, the nail striking member 13 is in a state constrained by the non-tooth portion 212 of the driving wheel 21, which can realize nail shooting.

Without intent to limit the scope of the invention, the further details of the force supply mechanism according to various embodiments of the invention are given below.

Embodiment 1: Single Type of Force Supply Mechanisms

Figure 5:
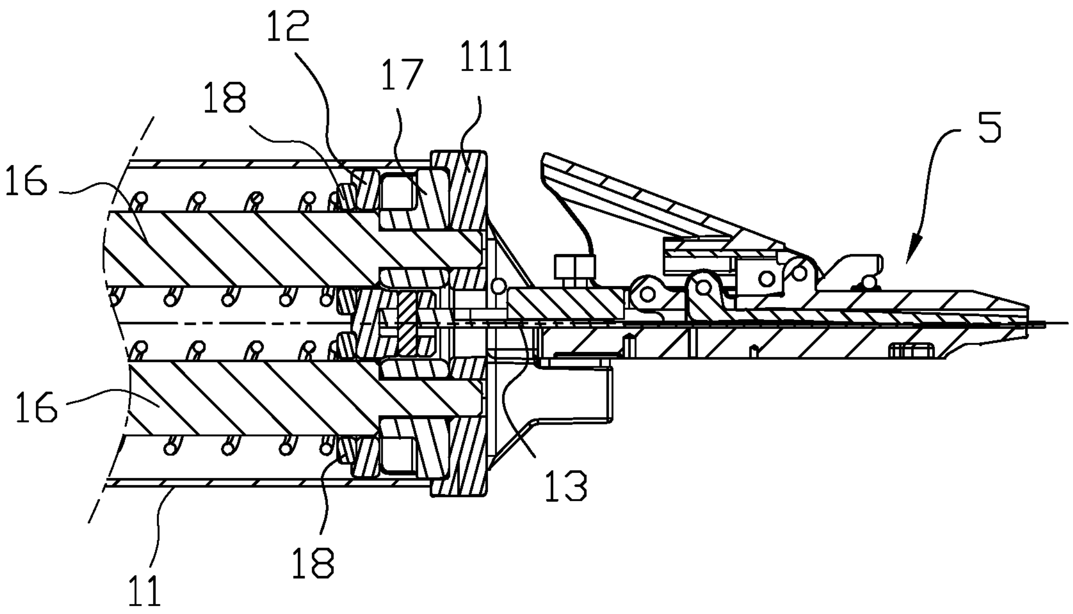
FIG. 5 shows schematically a partially cross-sectional view of a force supply mechanism and a gun nozzle according to one embodiment of the invention.

FIG. 5 is a cross-sectional view of the force supply mechanism 1 and the gun nozzle 5 of the nail gun of the invention.

As shown in FIG. 5, the force supply mechanism 1 includes a cylinder 11 set/arranged inside the nail gun, a piston 12 movably disposed in the cylinder 11, a nail striking member 13 co-movably connected to the piston 12 such that the nail striking member 13 operably moves backward and forward through the front end cover 111 of the cylinder 11 in a straight line, and a spring unit 14 disposed in the cylinder 11 and located between the piston 12 and the rear end cover 112 of the cylinder 11 and configured such that an engagement of the nail striking member 13 with the driving member/mechanism 2 causes the piston 12 to move backward in the cylinder 11 to push the spring unit 14 into a contract state so as to store energy therein, and an disengagement of the nail striking member 13 with the driving member 2 causes the spring unit 14 to release the stored energy therein to push the piston 12 to move forward in the cylinder 11 so that the nail striking member 13 is co-moved therewith to strike a nail out of a muzzle 5. In addition, the force supply mechanism 1 also includes a cushioning member 17 disposed between the piston 12 and the front end cover 111 of the cylinder 11 for absorbing shocks caused by striking/firing of the nail striking member 13, a front buffer piece 18 disposed between the piston 12 and the spring unit 14 for operably buffering vibrations of the spring unit 14, and a rear cushion member 19 disposed between the spring unit 14 and the rear end cover 112 of the cylinder 11 for operably cushioning vibration of the spring unit 14.

In some embodiments, the cylinder 11 is made of a metal material, the cylinder 11 has a front side/end portion 111 and a rear side/end portion 112. The front side portion 111 and the rear side portion 112 may be integrally formed at the front and rear ends of the cylinder 11, respectively, or may be separately provided at the front and rear ends of the cylinder 11, respectively. In the exemplary embodiment shown in FIG. 5, the front side portion 111 and the rear side portion 112 of the cylinder 11 is separately provided, that is, a front side portion 111 and a rear side portion 112 are fixed to the front and rear ends of the cylinder 11 by screws. The gun nozzle 5 is mounted on the front side portion 111 of the cylinder 11. It should be noted that in some embodiments, the front side portion 111 and the rear side portion 112 may respectively refer to a front end cover/portion and a rear end cover/portion of the of the cylinder 11.

The cylinder 11 has a plurality of symmetrically disposed guide rods 16 therein, each guide rod 16 has two ends fixed to the front end portion 111 and the rear end portion 112, respectively, and the piston 12 is movably mounted on the plurality of guide rods 16. Specifically, in some embodiments, both of the front end and the rear end of the guide rods 16 are provided with mounting convex columns, the front side portion 111 and the rear side portion 112 are provide with mounting grooves matched with the mounting convex columns in shape, and the guide rods 16 are fixed in the cylinder body 11 through the mounting grooves.

The piston 12 is movably disposed in the cylinder 11. In some embodiments, one or more mounting holes matching the shape of the guide rods 16 are formed on the piston 12, and the piston 12 is movably arranged on the guide rod 16 through the mounting holes. As such, the piston 12 dynamically divides the body of the cylinder 11 into a front chamber and a rear chamber. The nail striking member 13 has a mounting end co-movably connected to the piston 12 and a nailing end extending from the front end portion 111 of the cylinder 11 for striking/firing the nails. Specifically, a mounting post extends from the middle of the front end of the piston 12, and the mounting post is provided with a mounting groove, and the mounting end of the nail striking member 13 is inserted in the mounting groove, and is fixedly connected by a mounting pin. The nailing end of the nail striking member 13 operably moves backward and forward through the front end cover 111 of the cylinder 11 in a straight line and stretches into the firing channel of the gun nozzle 5 for striking the nails.

Figure 6:
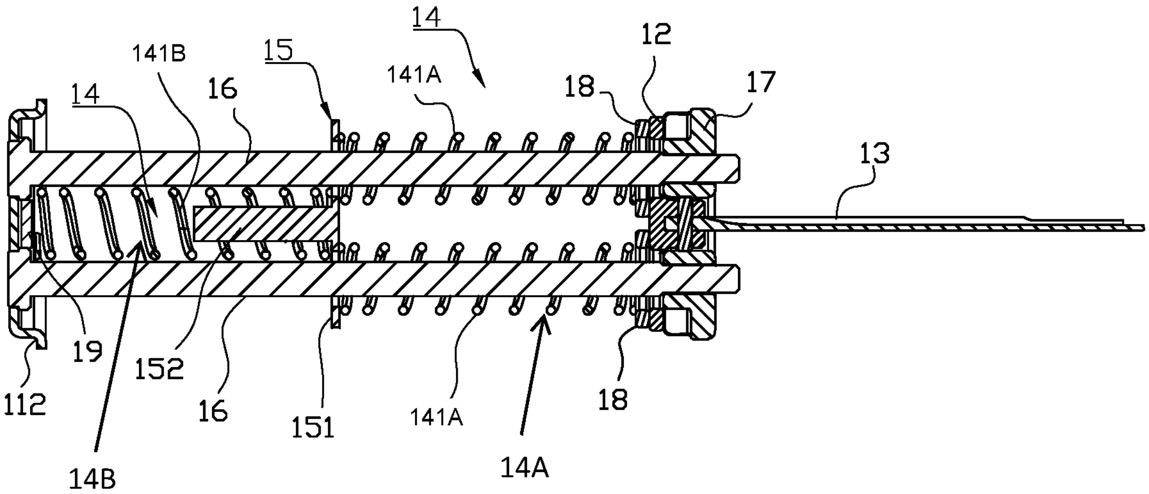
FIG. 6 shows schematically a cross-sectional view of a spring unit according to one embodiment of the invention.
Figure 7:
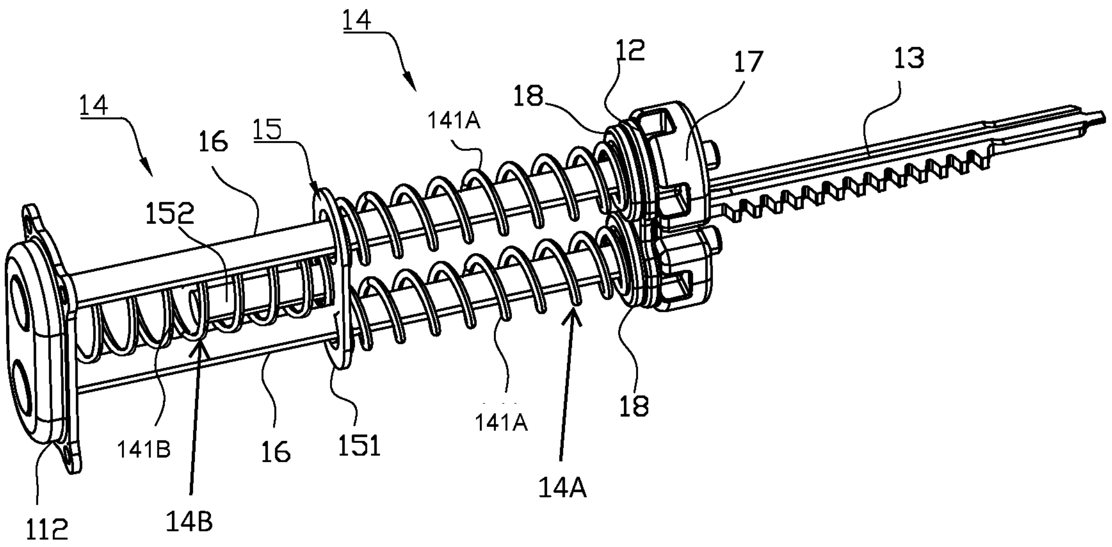
FIG. 7 is a schematic structural view of a spring unit according to one embodiment of the invention.

FIG. 6 is a sectional view of the spring unit 14 according to embodiments of the invention, and FIG. 7 is a schematic structural view of the spring unit 14 according to embodiments of the invention. In one exemplary embodiment shown in FIGS. 6 and 7, the spring unit 14 has at least two spring parts 14A and 14B arranged along a moving direction of the piston 12 in the cylinder 11, and a linkage piece 15 arranged between two adjacent spring parts 14A and 14B for linking the two adjacent spring parts 14A and 14B. The spring parts 14A and 14B are generally arranged one by one in series along a moving direction of the piston 12 such that the each spring part 14A or 14B is corresponding to a spring layer or a layer of springs, and the spring unit 14 has two or three layers of springs.

In some embodiments, each spring part 14A or 14B includes at least one spring 141A or 141B. At least one of the spring parts 14A and 14B includes a plurality of springs arranged side by side in parallel and symmetrically distributed around the central extension line of the nail striking member 13, or the central axis of the cylinder 11. For example, as shown in FIGS. 5-7, the spring part 14A has two springs 141A symmetrically arranged around the central extension line of the nail striking member 13, or the central axis of the cylinder 11, while the spring part 14B has one spring 141B.

The helical/spiral directions of the springs 141A or 141B in each spring part 14A or 14B are the same, while the helical directions of the springs 141A and 141B in the two adjacent spring parts 14A and 14B are opposite. For example, the helical/spiral direction of each parallel arranged spring 141A in the front spring part 14A is the same, and is opposite to the helical/spiral direction of each spring 141B of the rear spring part 14B.

In some embodiments, all the springs 141 are helical springs. Each spring 141 is one type of a cylindrical spring, a conical spring (i.e., inclined compression spring), a concave spring (i.e., a waist drum spring), and a convex spring (i.e., a drum spring). In addition, each spring 141 can be a equidistant spring or a variable pitch spring. It should be noted that other types of springs can also be utilized to practice the invention.

Figure 8:
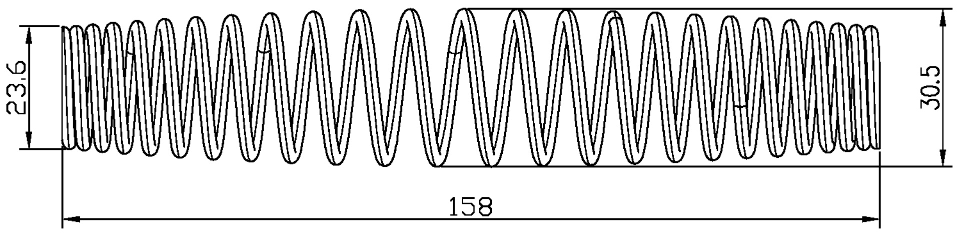
FIG. 8 is a schematic structural view of a convex spring of a spring unit according to one embodiment of the invention.

FIG. 8 shows one embodiment of a convex spring with dimensional parameters: a maximum spring outer diameter of 30.5 mm, a minimum spring outer diameter of 23.6 mm, and a length of 158 mm.

It should be noted that the length, diameter, and elastic coefficient of the spring do not affect the type of the spring, that is, when the factors such as the length, diameter, and elastic coefficient of the spring are different, they are also regarded as the same type of springs. In addition, the type of springs is determined by factors such as the spring shape, equidistant, variable pitch, and packaging method, and any one of these factors is different, they are regarded as different types of springs.

In some embodiments, the spring part 14A disposed near the front side portion 111 of the cylinder 11 is referred as a front spring part, and the spring part 14B disposed near the rear side portion 112 of the cylinder 11 is referred as a rear spring part.

As shown in FIG. 6, the arrangement of the springs in series is adopted. When the spring force is constant, the springs connected in series share the corresponding force value, which can avoid excessive compression of the spring and prevent premature fatigue of the spring, thereby increasing the life of the springs.

In the exemplary embodiment shown in FIG. 6, the front spring part 14A has two parallel arranged force supply springs 141A, which are symmetrically distributed around the center extension line of the nail striking member 13; the rear spring part 14B has one force supply springs 141B.

In the exemplary embodiment shown in FIG. 6, the cylinder 11 has two symmetrically disposed guide rods 16, two ends of each guide rod 16 are respectively fixed to the front side portion 111 and the rear side portion 112, and the piston 12 is movably mounted on the plurality of guide rods 16. The force supply springs 141A of the front spring part 14A are respectively sleeved on the two symmetrically disposed guide rods 16.

In order to facilitate the mounting with the rear spring part 14B, the linkage piece 15 has a plurality of mounting portions 151 movably arranged on the plurality of guide rods 16 and at least one guiding rod portion 152. In the exemplary embodiment shown in FIG. 6, the mounting portions 151 are two holes having shapes respectively matching the shapes of the guide rods 16, such that the mounting portions 151 are sleeved on the guide rods 16, and abut against one ends of the corresponding front springs 141A of the spring part 14A. The guiding rod portion 152 extends from the center of the rear side of the linkage piece 15, one end of the rear spring 141B of the rear spring part 14B is mounted on the guide rod portion 152, and the other end of the rear spring 141B of the rear spring part 14B is mounted on the rear side portion 112 of the cylinder 11.

In another embodiment, if one force supply spring is arranged in the front spring part 14A and two parallel force supply springs are arranged in the rear spring part 14B, only the position of the linkage piece 15 needs to be reversed, so that one end of the front spring part is installed on the guide rod part 152, and the other end of the front spring part is installed on the piston 12.

In order to further improve the vibration damping effect, a front buffer piece 18 is provided between the piston 12 and the front end cover 111 of the cylinder 11 for damping the vibrations of the front spring part 14A; and a rear cushion member 19 is provided between the rear side portion 112 of the cylinder 11 and the rear spring 141B for cushioning vibrations of the rear spring part 14B.

In some embodiments, the comprehensive elastic coefficients of the spring parts 14A and 14B are configured to be different. Since the comprehensive elastic coefficients of the spring parts 14A and 14B are different, the spring unit 14 can be rebounded after the nail is shot, and the two spring parts 14A and 14B can cushion each other through the different accelerations caused by the different resilience forces of the two spring parts 14A and 14B, so as to reduce the acceleration of the rebound to offset partial resilience force. It also reduces the impact force acting on the cylinder body and realizes the effect of vibration reduction. Meanwhile, because the rebound acceleration is reduced, the vibration time of the spring unit is also reduced, thereby ensuring the stability of the nail gun and reducing the labor intensity of the user.

In some embodiments, the force supply spring 141A or 141B may be formed of a plurality of sub-springs connected in series.

In addition, the force supply spring 141A or 141B may be formed of one or more twisted strands of metal materials.

In addition, a cushioning member 17 is provided on the inner wall of the front side portion 111 of the cylinder 11, and the outer edge of the cushioning member 17 abuts against the inner wall of the cylinder 11. After a nail is shot/fired, the piston 12 hits the cushioning member 17, the cushioning member 17 contracts. At the same time, the impact force is quickly transmitted to the cylinder body 11, so as to achieve rapid transfer and dissipation.

The cushioning member 17, the front buffer piece 18, and the rear cushion member 19 are made of rubber or elastic plastic.

According to the exemplary embodiments of the invention, the nail gun has a driving device comprising a single force supply mechanism 1 with a spring unit including a single types of springs.

The single force supply mechanism 1 includes a cylinder 11, a piston 12, a nailing striking member 13 and a spring unit 14. The spring unit 14 has two or more spring parts 14A and 14B arranged along a moving direction of the piston 12; and a linkage piece 15 arranged between two adjacent spring parts 14A and 14B for linking the two adjacent spring parts 14A and 14B, each of the spring parts 14A and 14B comprises at least one spring 141A or 141B, and at least one of the spring parts 14A and 14B comprises a plurality of springs arranged in parallel and symmetrically distributed around a central extension line of the nail striking member 13, and all the springs 141A and 141B are a single type of helical springs. After the multiple spring parts are combined with each other, a larger comprehensive elastic coefficient can be formed in a unit space to provide greater nailing power and meet the needs of high-power nail guns.

In addition, the spring parts 14 are arranged to have a front spring part 14A disposed near the front side portion 111 of the cylinder 11 and a rear spring part 14B disposed near the rear side portion 112 of the cylinder 11, and the comprehensive elastic coefficients of the spring parts 14A and 14B are configured to be different. As such an arrangement, the spring unit 14 can be rebounded after the nail is shot/fired, and the two spring parts 14A and 14B can cushion each other through the different accelerations caused by the different resilience forces of the two spring parts 14A and 14B, so as to reduce the acceleration of the rebound to offset partial resilience force. It also reduces the impact force acting on the cylinder body and realizes the effect of vibration reduction. Meanwhile, because the rebound acceleration is reduced, the vibration time of the spring unit is also reduced, thereby ensuring the stability of the nail gun and reducing the labor intensity of the user.

Embodiment 2: Variable Pitch Type of Force Supply Mechanisms

As shown in FIG. 5, the force supply mechanism 1 includes a cylinder 11 set/arranged inside the nail gun, a piston 12 movably disposed in the cylinder 11, a nail striking member 13 co-movably connected to the piston 12 such that the nail striking member 13 operably moves backward and forward through the front end cover 111 of the cylinder 11 in a straight line, and a spring unit 14 disposed in the cylinder 11 and located between the piston 12 and the rear end cover 112 of the cylinder 11 and configured such that an engagement of the nail striking member 13 with the driving member/mechanism 2 causes the piston 12 to move backward in the cylinder 11 to push the spring unit 14 into a contract state so as to store energy therein, and an disengagement of the nail striking member 13 with the driving member 2 causes the spring unit 14 to release the stored energy therein to push the piston 12 to move forward in the cylinder 11 so that the nail striking member 13 is co-moved therewith to strike a nail out of a muzzle 5. In addition, the force supply mechanism 1 also includes a cushioning member 17 disposed between the piston 12 and the front end cover 111 of the cylinder 11 for absorbing shocks caused by striking/firing of the nail striking member 13, a front buffer piece 18 disposed between the piston 12 and the spring unit 14 for operably buffering vibrations of the spring unit 14, and a rear cushion member 19 disposed between the spring unit 14 and the rear end cover 112 of the cylinder 11 for operably cushioning vibration of the spring unit 14.

In some embodiments, the cylinder 11 is made of a metal material, the cylinder 11 has a front side/end portion 111 and a rear side/end portion 112. The front side portion 111 and the rear side portion 112 may be integrally formed at the front and rear ends of the cylinder 11, respectively, or may be separately provided at the front and rear ends of the cylinder 11, respectively. In the exemplary embodiment shown in FIG. 5, the front side portion 111 and the rear side portion 112 of the cylinder 11 is separately provided, that is, a front side portion 111 and a rear side portion 112 are fixed to the front and rear ends of the cylinder 11 by screws. The gun nozzle 5 is mounted on the front side portion 111 of the cylinder 11. It should be noted that in some embodiments, the front side portion 111 and the rear side portion 112 may respectively refer to a front end cover/portion and a rear end cover/portion of the of the cylinder 11.

The cylinder 11 has a plurality of symmetrically disposed guide rods 16 therein, each guide rod 16 has two ends fixed to the front end portion 111 and the rear end portion 112, respectively, and the piston 12 is movably mounted on the plurality of guide rods 16. Specifically, in some embodiments, both of the front end and the rear end of the guide rods 16 are provided with mounting convex columns, the front side portion 111 and the rear side portion 112 are provide with mounting grooves matched with the mounting convex columns in shape, and the guide rods 16 are fixed in the cylinder body 11 through the mounting grooves.

The piston 12 is movably disposed in the cylinder 11. In some embodiments, one or more mounting holes matching the shape of the guide rods 16 are formed on the piston 12, and the piston 12 is movably arranged on the guide rod 16 through the mounting holes. As such, the piston 12 dynamically divides the body of the cylinder 11 into a front chamber and a rear chamber. The nail striking member 13 has a mounting end co-movably connected to the piston 12 and a nailing end extending from the front end portion 111 of the cylinder 11 for striking/firing the nails. Specifically, a mounting post extends from the middle of the front end of the piston 12, and the mounting post is provided with a mounting groove, and the mounting end of the nail striking member 13 is inserted in the mounting groove, and is fixedly connected by a mounting pin. The nailing end of the nail striking member 13 operably moves backward and forward through the front end cover 111 of the cylinder 11 in a straight line and stretches into the firing channel of the gun nozzle 5 for striking the nails.

Figure 9:
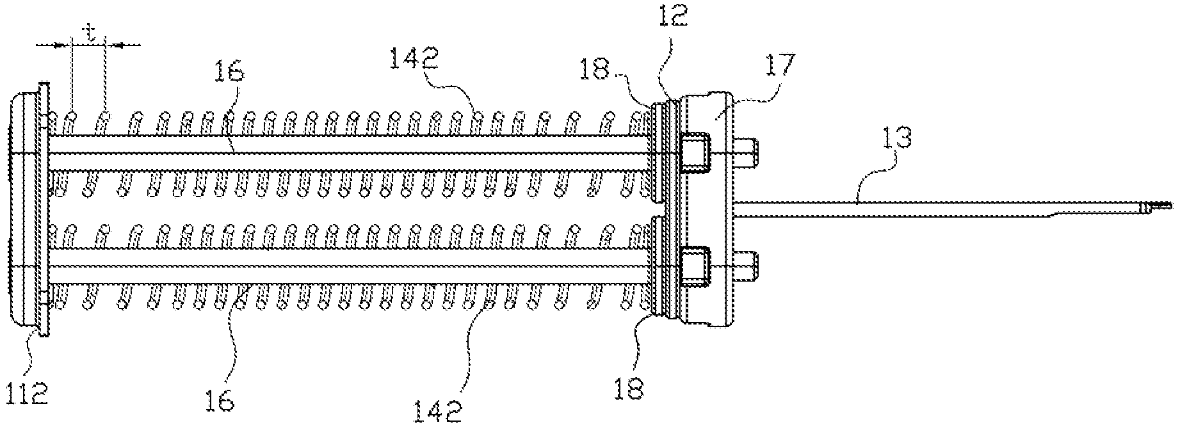
FIG. 9 shows schematically a cross-sectional view of a spring unit according to one embodiment of the invention.
Figure 10:
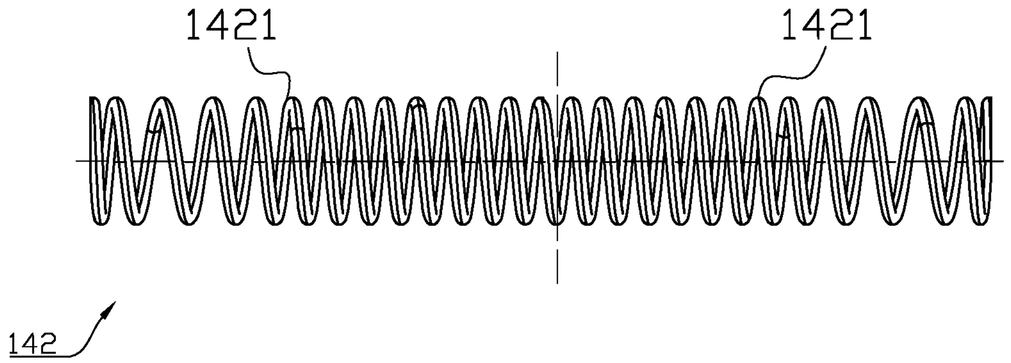
FIG. 10 is a schematic structural view of a variable pitch spring of a spring unit according to one embodiment of the invention.

FIG. 9 is a sectional view of the spring unit 14 according to embodiments of the invention, and FIG. 10 is a schematic structural view of a variable pitch spring 1421 according to embodiments of the invention.

As shown in FIG. 9, the spring unit 14 is freely mounted between the piston 12 and the rear side portion 112 of the cylinder 11, and has at least one variable pitch spring 142 abutting against the piston 12. The variable pitch spring 142 has a pitch t that is different at different positions and different helical angles of the spring.

In some embodiments, the variable pitch spring 142 has at least one pitch variable segment/section/portion 1421, and the pitch t of the pitch variable segment 1421 is gradually increased or decreased.

As shown in FIG. 10, the variable pitch spring 142 has two variable pitch sections 1421, and the two variable pitch sections 1421 are helically formed by the same metal wire. The pitch t of one of the variable pitch sections 1421 decreases gradually, and the pitch t of the other variable pitch section 1421 gradually increases, so that the entire variable pitch spring 142 is in a state where the pitch at middle is small and the pitch at both ends is large.

In order to increase the driving force of the nail, the spring unit 14 also has a plurality of variable pitch springs arranged side by side, and the specification parameters of the variable pitch springs are all the same, and are distributed symmetrically around the central extension line of the nail striking member 13. In order to better realize the deformation of the spring, the variable pitch spring is sleeved on the corresponding guide rod 16.

In some embodiments, when the spring unit 14 has only one variable pitch spring, the guide rod 16 may not be needed, and it can be directly guided by the inner wall of the cylinder body 11 to achieve the same effect.

In some embodiments, the front end of the variable pitch spring 142 is provided with a front buffer piece 18, and its rear end is provided with a rear cushion member 19. The front buffer piece 18 and the rear cushion member 19 are both ring-shaped, and are sleeved on the corresponding guide rod 16.

In addition, a cushioning member 17 is provided on the inner wall of the front side portion 111 of the cylinder 11, and the outer edge of the cushioning member 17 abuts against the inner wall of the metal cylinder 11. After nailing, the piston 12 hits the cushioning member 17, the cushioning member 17 contracts, and the impact force is rapidly transmitted to the cylinder 11, thereby achieving rapid transfer and dissipation.

The cushioning member 17, the front buffer piece 18, and the rear cushion member 19 are made of rubber or elastic plastic.

Since the pitches of the variable pitch spring 142 are different, the generated vibration frequencies are different, which makes the different parts of the variable pitch spring 142 produce different rebound forces after the variable-pitch spring is compressed to store energy, and released to release the stored energy, thereby generating different accelerated speeds that can cause them to buffer each other internally, and reduce the acceleration of the rebound internally, so as to offset partially the rebound force.

Meanwhile, the rebound acceleration is reduced, so that the vibration time of the spring unit is reduced, thereby ensuring the stability of the nail gun, reducing the labor intensity of the user, and improving the nailing effect.

Figure 11:
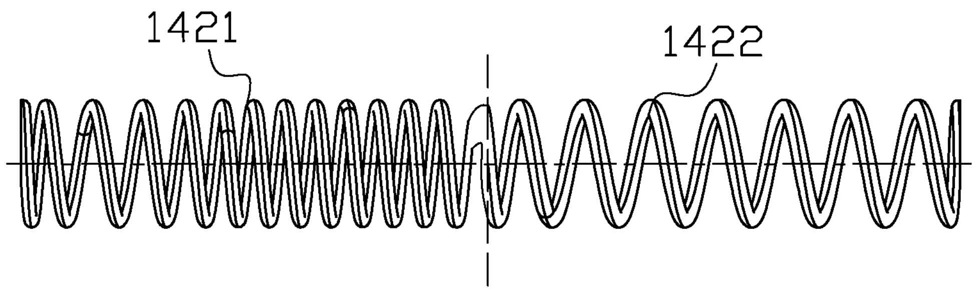
FIG. 11 is a schematic structural view of a variable pitch spring of a spring unit according to another embodiment of the invention.

In some embodiments, the variable pitch spring has at least one variable pitch section and at least one equidistant section connected to the at least one variable pitch section, and the pitches of the at least one equidistant section are the same. As shown in FIG. 11, the variable pitch spring 142 has a variable pitch section 1421 and an equidistant section 1422, and the variable pitch section 1421 and the equidistant section 1422 are formed by winding the same metal wire. The pitch t of one of the variable pitch sections 1421 gradually decreases, and the pitches t of the equidistant sections 1422 are all equal.

After the variable-pitch spring is compressed to store energy, and released to release the stored energy, the generated vibration frequencies are different due to different pitches, so that the nailing efficiency is improved.

Figure 12:
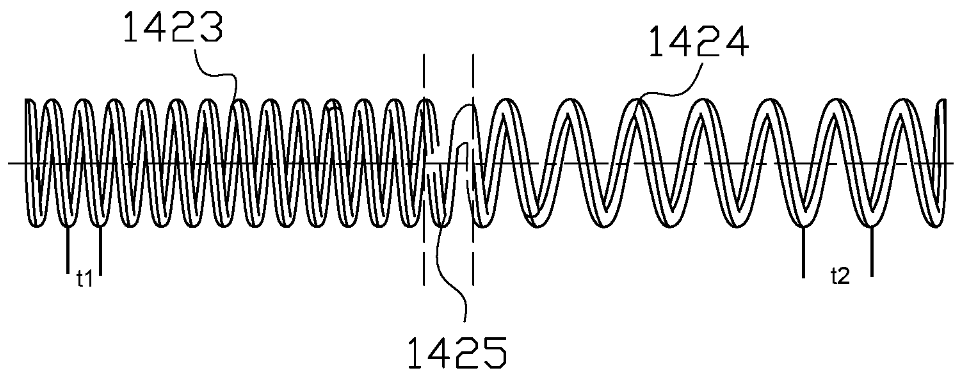
FIG. 12 is a schematic structural view of a variable pitch spring of a spring unit according to yet another embodiment of the invention.

In some embodiments, the variable pitch spring has at least two equidistant sections with different pitches and a transition section connecting two adjacent equidistant sections, and the pitch of the same equidistant section is the same. As shown in FIG. 12, the variable pitch spring has a first equidistant section 1423, a second equidistant section 1424, and a transition section 1425 connecting the first equidistant section 1423 and the second equidistant section 1424. The first equidistant section 142, the second equidistant section 1424, and the transition section 1425 are formed of the same metal wire. All the pitches of the first equidistant section 1423 are t1, all the pitches of the second equidistant section 1424 are t2, and the pitches t1 of the first equidistant section 1423 are smaller than the pitches t2 of the second equidistant section 1424.

When there are multiple first equidistant segments 1423 and second equidistant segments 1424, the first equidistant segments 1423 and the second equidistant segments 1424 are distributed at intervals and connected by the transition segment 1425.

After the variable-pitch spring is compressed to store energy, and released to release the stored energy, the generated vibration frequencies are different due to different pitches, so that the nailing efficiency is improved.

Figure 13:
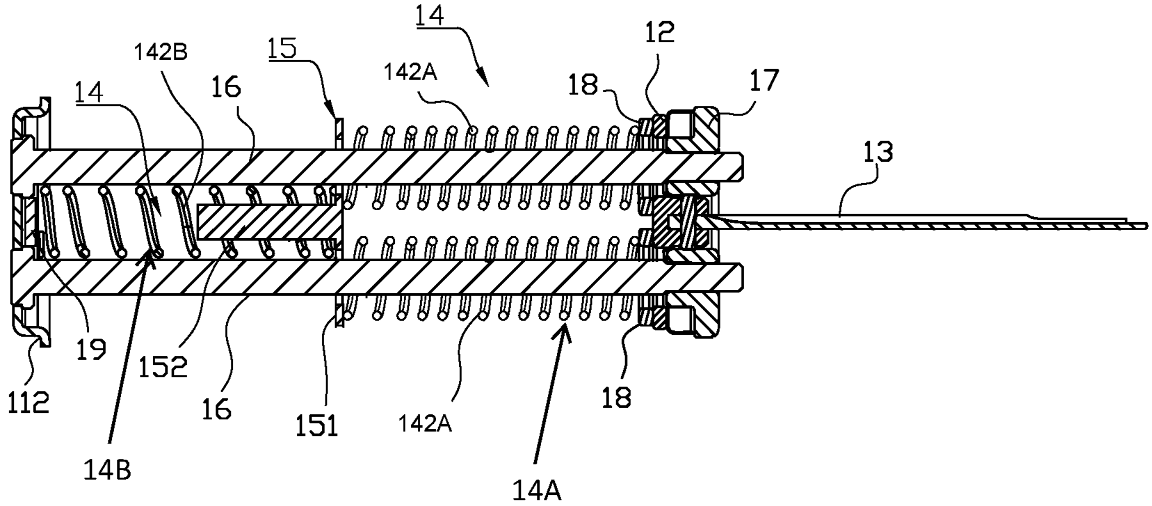
FIG. 13 shows schematically a cross-sectional view of a spring unit according to one embodiment of the invention.
Figure 14:
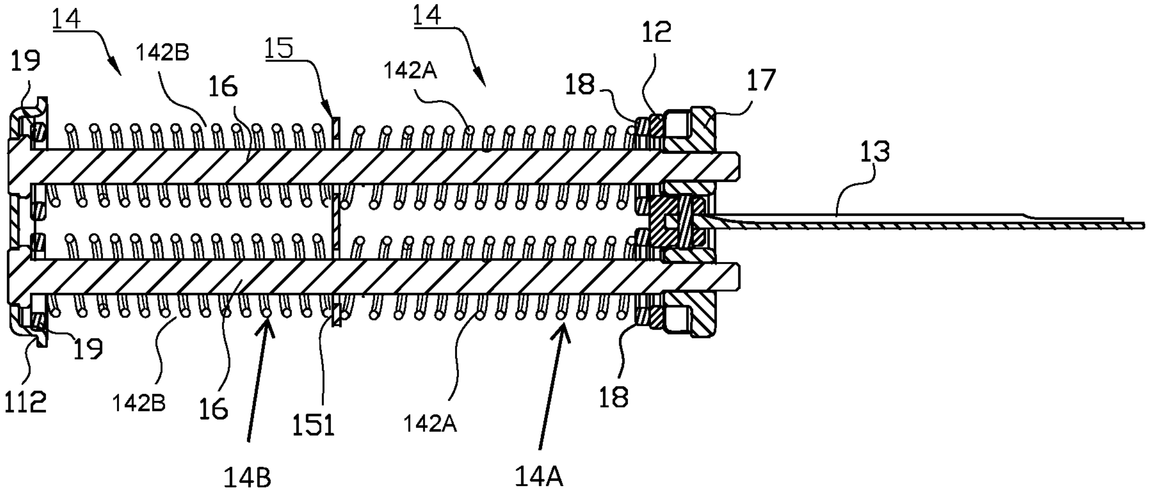
FIG. 14 shows schematically a cross-sectional view of a spring unit according to another embodiment of the invention.

In some embodiments, as shown in FIGS. 13-14, the spring unit 14 has at least two spring parts 14A and 14B and a linking piece 15. The at least two spring parts 14 are arranged along the moving direction of the piston 12. Each spring part 14A or 14B includes at least one variable pitch spring 142, and the linkage piece 15 is arranged between two adjacent spring parts 14A and 14B for linking the two adjacent spring parts 14A and 14B.

When there is only one variable pitch spring 142A or 142B in each spring part 14A or 14B, all the variable pitch springs 142A and 142B may be arranged in series, and the variable pitch springs 142A and 142B in the adjacent spring parts 14A and 14B are coupled to each other by the linkage piece 15.

In the exemplary embodiments, the comprehensive elastic coefficients of the spring parts 14A and 14B are configured to be different. As such an arrangement, in the process of rebounding the spring unit 14 after nailing, the different accelerations caused by the different rebounding forces of the two spring parts 14A and 14B can cause mutual buffering between the two spring parts 14A and 14B, and reduce the acceleration of rebounding, thereby offsetting partially resilience force. It also reduces the impact force acting on the cylinder body and realizes the effect of vibration reduction. Meanwhile, because the rebound acceleration is reduced, the vibration time of the spring unit is also reduced, thereby ensuring the stability of the nail gun and reducing the labor intensity of the user.

In one embodiment, as shown in FIG. 13, the spring part disposed near the front side portion 111 is a front spring part 14A, the spring part disposed near the rear side portion 112 is a rear spring part 14B, and the combined elastic coefficients of the front spring part 14A and the rear spring part 14B are different. The front spring part 14A or the rear spring part 14B has at least two pitch springs 142A or 142B disposed in parallel and symmetrically distributed around the central extension line of the nail striking member 13.

In one embodiment, the spiral directions of the variable pitch springs of each spring part are the same; the variable pitch springs in the two adjacent spring parts have opposite spiral directions. Specifically, the variable pitch springs 142A of the front spring part 14A arranged in parallel have the same spiral direction, and are opposite to that of the variable pitch springs 142B of the rear spring part 14B. In the embodiment shown in FIG. 13 two variable pitch springs 141A connected in parallel are disposed in the front spring part 14A, and one variable pitch spring 141B is disposed in the rear spring part 14B. Two guide rods 16 are symmetrically arranged in the cylinder 11, two ends of each guide rod 16 are fixed to the front side portion 111 and the rear side portion 112, respectively, and the piston 12 are movably installed on the guide rods 16. The variable pitch springs 141A of the front spring part 14A are respectively sleeved on the corresponding guide rods 16.

In order to facilitate the mounting with the rear spring part 14B, the linkage piece 15 has a plurality of mounting portions 151 movably arranged on the plurality of guide rods 16 and at least one guiding rod portion 152. In the exemplary embodiment shown in FIG. 13, the mounting portions 151 are two holes having shapes respectively matching the shapes of the guide rods 16, such that the mounting portions 151 are sleeved on the guide rods 16, and abut against one ends of the corresponding front springs 141A of the spring part 14A. The guiding rod portion 152 extends from the center of the rear side of the linkage piece 15, one end of the rear spring 141B of the rear spring part 14B is mounted on the guide rod portion 152, and the other end of the rear spring 141B of the rear spring part 14B is mounted on the rear side portion 112 of the cylinder 11.

In another embodiment, if one force supply spring is arranged in the front spring part 14A and two parallel force supply springs are arranged in the rear spring part 14B, only the position of the linkage piece 15 needs to be reversed, so that one end of the front spring part is installed on the guide rod part 152, and the other end of the front spring part is installed on the piston 12.

In order to further improve the vibration damping effect, a front buffer piece 18 is provided between the piston 12 and the front end cover 111 of the cylinder 11 for damping the vibrations of the front spring part 14A; and a rear cushion member 19 is provided between the rear side portion 112 of the cylinder 11 and the rear spring 141B for cushioning vibrations of the rear spring part 14B.

Further, the exemplary embodiment of the spring unit 14 has the following advantages:

1. On the premise of not enlarging the cylinder body 11, the comprehensive elastic coefficient of the spring unit can be further increased to provide greater nailing power.

2. Due to the difference in the spiral direction, quality and stiffness of the springs, the vibration frequencies of the springs in different spring parts after compressed and released are different, so that the springs cannot resonate, and the impact forces of the springs mutually offset a part, which greatly reduces the vibration after nailing. The vibration reduction effect and the nailing effect thus are improved, and the nailing is more labor-saving and comfortable.

In another embodiment, as FIG. 14, two variable pitch springs 142A connected in parallel are provided in the front spring part 14A, and two variable pitch springs 142B connected in parallel are also provided in the rear spring part 14B. The two groups 142A and 142B of the variable pitch springs 142 of the front spring part 14A and the rear spring part 14B are respectively sleeved on the two guide rods 16 and interact with each other through the linkage pieces 15.

According to the exemplary embodiments of the invention, the nail gun has a driving device comprising a variable pitch force supply mechanism 1 with a spring unit including variable pitch springs. The variable pitch force supply mechanism includes a cylinder 11, a piston 12, a nail striking member 13, and a spring unit 14. The spring unit 14 is freely installed between the piston 12 and the rear side portion 111 of the cylinder 11 and has at least one variable pitch spring abutted against the piston 12. Due to the different pitches of some parts of the variable-pitch springs, the elastic coefficients are different, which makes the spring unit produce different rebound forces during the process of rebounding after nailing, and generate different accelerations. It causes them to buffer each other internally and reduce the acceleration of the rebound, thereby offsetting partially the rebound force. The impact force acting on the cylinder body is also reduced, and the effect of vibration reduction is realized. At the same time, since the rebound acceleration is reduced, the vibration time of the spring unit is also reduced, ensuring the stability of the nail gun and reducing the dynamic strength of the user.

In addition, since the comprehensive elastic coefficients of the two spring parts are different, the spring unit can be rebounded after nailing, and the different accelerations caused by the different rebound forces of the two spring parts can result in mutual cushioning, further reducing the acceleration of the rebound, so as to counteract partially the rebound force.

Embodiment 3: Sleeving Type of Force Supply Mechanisms

Figure 15:
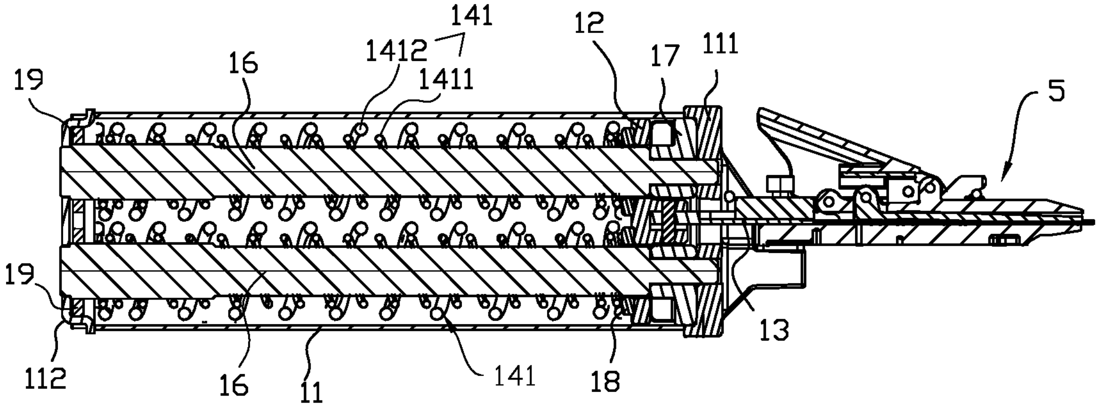
FIG. 15 shows schematically a cross-sectional view of a spring unit according to yet another embodiment of the invention.

FIG. 15 shows another embodiment of the force supply mechanism of the invention. As shown in FIG. 15, the force supply mechanism 1 includes a cylinder 11 set/arranged inside the nail gun, a piston 12 movably disposed in the cylinder 11, a nail striking member 13 co-movably connected to the piston 12 such that the nail striking member 13 operably moves backward and forward through the front end cover 111 of the cylinder 11 in a straight line, and a spring unit 14 disposed in the cylinder 11 and located between the piston 12 and the rear end cover 112 of the cylinder 11 and configured such that an engagement of the nail striking member 13 with the driving member/mechanism 2 causes the piston 12 to move backward in the cylinder 11 to push the spring unit 14 into a contract state so as to store energy therein, and an disengagement of the nail striking member 13 with the driving member 2 causes the spring unit 14 to release the stored energy therein to push the piston 12 to move forward in the cylinder 11 so that the nail striking member 13 is co-moved therewith to strike a nail out of a muzzle 5. In addition, the force supply mechanism 1 also includes a cushioning member 17 disposed between the piston 12 and the front end cover 111 of the cylinder 11 for absorbing shocks caused by striking/firing of the nail striking member 13, a front buffer piece 18 disposed between the piston 12 and the spring unit 14 for operably buffering vibrations of the spring unit 14, and a rear cushion member 19 disposed between the spring unit 14 and the rear end cover 112 of the cylinder 11 for operably cushioning vibration of the spring unit 14.

In some embodiments, the cylinder 11 is made of a metal material, the cylinder 11 has a front side/end portion 111 and a rear side/end portion 112. The front side portion 111 and the rear side portion 112 may be integrally formed at the front and rear ends of the cylinder 11, respectively, or may be separately provided at the front and rear ends of the cylinder 11, respectively. In the exemplary embodiment shown in FIG. 5, the front side portion 111 and the rear side portion 112 of the cylinder 11 is separately provided, that is, a front side portion 111 and a rear side portion 112 are fixed to the front and rear ends of the cylinder 11 by screws. The gun nozzle 5 is mounted on the front side portion 111 of the cylinder 11. It should be noted that in some embodiments, the front side portion 111 and the rear side portion 112 may respectively refer to a front end cover/portion and a rear end cover/portion of the of the cylinder 11.

The cylinder 11 has a plurality of symmetrically disposed guide rods 16 therein, each guide rod 16 has two ends fixed to the front end portion 111 and the rear end portion 112, respectively, and the piston 12 is movably mounted on the plurality of guide rods 16. Specifically, in some embodiments, both of the front end and the rear end of the guide rods 16 are provided with mounting convex columns, the front side portion 111 and the rear side portion 112 are provide with mounting grooves matched with the mounting convex columns in shape, and the guide rods 16 are fixed in the cylinder body 11 through the mounting grooves.

The piston 12 is movably disposed in the cylinder 11. In some embodiments, one or more mounting holes matching the shape of the guide rods 16 are formed on the piston 12, and the piston 12 is movably arranged on the guide rod 16 through the mounting holes. As such, the piston 12 dynamically divides the body of the cylinder 11 into a front chamber and a rear chamber. The nail striking member 13 has a mounting end co-movably connected to the piston 12 and a nailing end extending from the front end portion 111 of the cylinder 11 for striking/firing the nails. Specifically, a mounting post extends from the middle of the front end of the piston 12, and the mounting post is provided with a mounting groove, and the mounting end of the nail striking member 13 is inserted in the mounting groove, and is fixedly connected by a mounting pin. The nailing end of the nail striking member 13 operably moves backward and forward through the front end cover 111 of the cylinder 11 in a straight line and stretches into the firing channel of the gun nozzle 5 for striking the nails.

The spring unit 14 is freely mounted between the piston 12 and the rear side portion 112 of the cylinder 11. The spring unit 14 has at least two spring sets 141 arranged side by side in parallel and distributed symmetrically around a central extension line of the nail striking member 13. Each of the spring sets 141 comprises at least one inner spring 1411 and an outer spring 1412 that sleeves the at least one inner spring 1411 inside. The helical direction of an inner spring 1411 adjacent to the outer spring 1412 is opposite to that of the outer spring 1412.

The spring sets 141 are arranged side by side in parallel, are sleeved on the corresponding guide rods 16, and are symmetrically distributed around the central extension line of the nail striking member 13.

In this embodiment shown in FIG. 15, the spring unit has two spring sets and two guide rods 16 vertically distributed inside the cylinder 11, and each spring set is sleeved on a corresponding guide rod 16 and symmetrically distributed around the central extension line of the nail ejection rod 13. Therefore, when the nail is shot/fired, the resultant force of the spring set can be effectively concentrated on the nail striking member 13.

The spring set comprises an inner spring 1411 and an outer spring 1422 of the same length, which are coaxially arranged and sleeved on the same guide rod 16.

According to the invention, this embodiment of the spring set provides the following advantages:

1. On the premise of not enlarging the cylinder body 11, the comprehensive elastic coefficient of the spring set is increased to obtain an elastic force as large as possible, so that it can produce greater nailing power.

2. The ratio of the maximum load force of the outer spring 1422 to the maximum load force of the inner spring 1411 is 5:2.

3. In order to ensure the concentric relationship of the combined springs, the helical directions of the inner spring 1411 and the outer spring 1422 are opposite, so that the inner and outer springs can be prevented from skewing or interfering with each other during compression or expansion.

4. Due to the differences in the helical direction and load of the springs, the resulting resonances of the springs are not at the same frequency, which greatly reduces the vibration after doing work, thus improving the comfort after nailing.

In some embodiments, the front end of the spring sets is provided with a front buffer piece 18, the rear end of the spring sets is provided with a cushion member 19, and the front buffer piece 18 and the cushion member 19 are both annular and are sleeved on the corresponding guide rods 16.

In addition, a cushioning member 17 is provided on the inner wall of the front side portion 111 of the cylinder 11, and the outer edge of the cushioning member 17 abuts against the inner wall of the metal cylinder 11. After nailing, the piston 12 impacts the cushioning member 17, the cushioning member 17 contracts, and the impact force is rapidly transmitted to the cylinder 11, so that the rapid transfer and the dissipation are realized.

In some embodiments, the cushioning member 17, the front buffer piece 18, and the rear cushion member 19 are made of rubber or elastic plastic.

Figure 16:
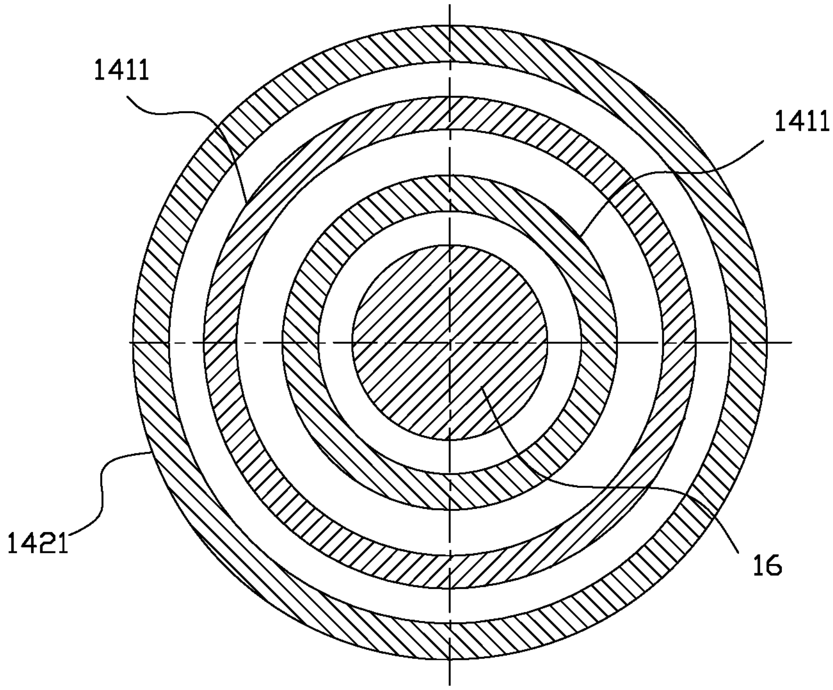
FIG. 16 is a schematic structural view of an arrangement of a sleeving spring of a spring unit according to one embodiment of the invention.
Figure 17:
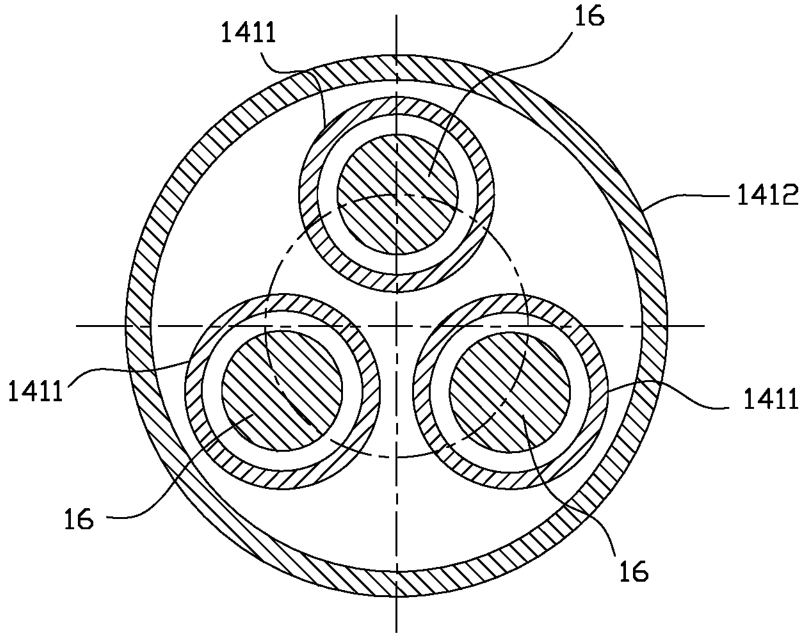
FIG. 17 is a schematic structural view of an arrangement of a sleeving spring of a spring unit according to another embodiment of the invention.

FIG. 16 is a schematic structural view of the coaxial arrangement of the spring set of the invention and FIG. 17 is a schematic structural view of a plurality of inner springs symmetrically arranged in the spring set of the invention.

When the spring set contains multiple inner springs, there are two sleeving types.

The first sleeving type: the spring set comprises more than two inner springs with different diameters, the inner springs and the outer springs are coaxially arranged, and the spiral directions of the two adjacent inner springs are opposite. As shown in FIG. 16, the spring set includes two inner springs 1411 with different diameters and an outer spring 1412, which are sequentially sleeved on the same guide rod 16 according to the diameters, and the smaller the diameter of the inner spring, the closer the inner spring is to the guide rod 16. The spiral direction of the smallest diameter of the inner springs 1411 is aligned with the same spiral direction of the outer spring 1412, while the spiral direction of the middle inner spring 1411 is opposite to that of the other two springs.

According to the invention, this embodiment of the spring set provides the following advantages:

1. On the premise of not enlarging the cylinder body 11, the comprehensive elastic coefficient of the spring group can be further increased to provide greater nailing power.

2. Through the different settings of the helical directions, the concentric relationship of the sleeving springs can be ensured, and the inner and outer springs can be prevented from skewing or interfering with each other.

3. Due to the difference in the spiral direction, quality and stiffness of the springs, the vibration frequencies of the springs after compressed and released are different, so that the springs cannot resonate, and the impact forces of the springs mutually offset a part, which greatly reduces the vibration after nailing. The vibration reduction effect and the nailing effect thus are improved, and the nailing is more labor-saving and comfortable.

4. In the case of obtaining a certain spring strength, the spring set has the advantages of small size and convenient installation.

The second sleeving type: the spring set comprises an outer spring and a plurality of inner springs with the same diameter, and the inner springs are symmetrically arranged inside the outer spring. As shown in FIG. 17, the spring set includes three inner springs 1411 with the same diameter, and one outer spring 1412. The three guide rods 16 are uniformly distributed in the circumferential direction with the central extension line of the nail striking member 13 as the axis. The inner springs 1411 are connected side by side in parallel and respectively sleeved on the corresponding guide rods 16.

In one embodiment, the spiral direction of two inner springs 1411 is opposite to that of the outer spring 1412, and the spiral direction of the other inner spring 1411 is the same as that of the outer spring 1412.

This embodiment makes full use of the space inside the outer spring 1412, thereby increasing the overall elastic modulus of the spring set.

Compared with the first sleeving type, the inner springs 1411 of the second sleeving type are respectively sleeved on the corresponding guide rods 16, and the positions are relatively fixed, so that the possibility of collision among the springs can be greatly reduced, and the interference among the springs is avoided.

Figure 18:
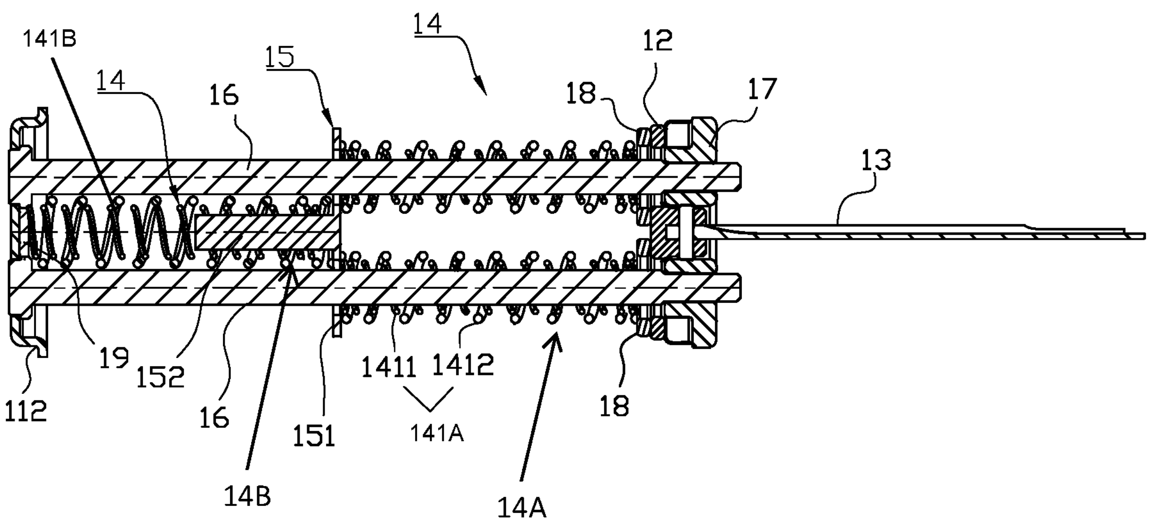
FIG. 18 shows schematically a cross-sectional view of a spring unit according to one embodiment of the invention.
Figure 19:
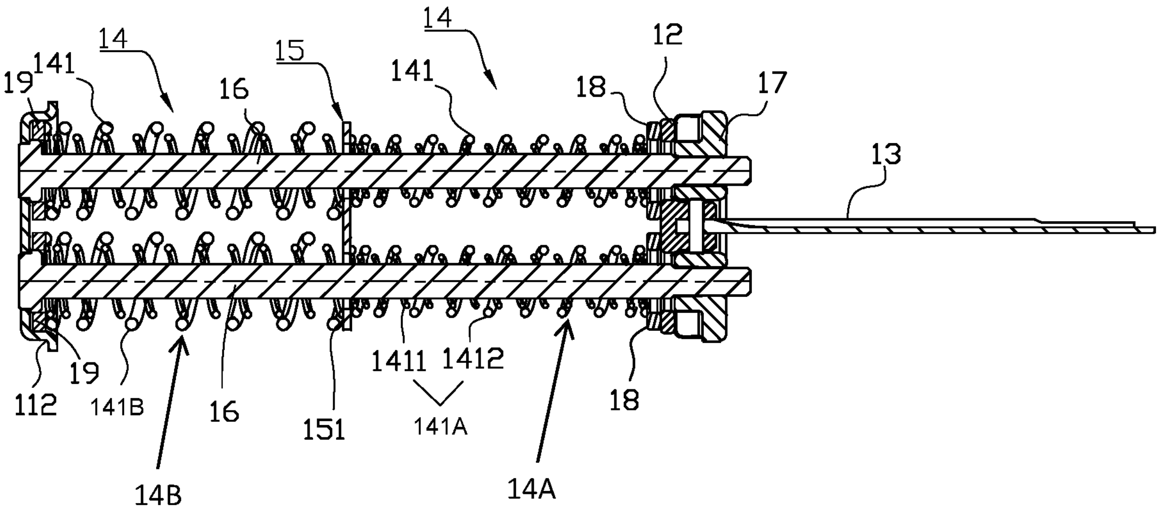
FIG. 19 shows schematically a cross-sectional view of a spring unit according to another embodiment of the invention.

In some embodiments, as shown in FIGS. 18-19, the force supply mechanism 1 having the spring unit 14 including at least two spring parts 14A and 14B and a linking piece 15.

The spring parts 14A and 14B are arranged along the moving direction of the piston 12. Each spring part has at least one spring set, each spring set 141 comprises at least one inner spring 1411 and an outer spring 1412 that sleeves the at least one inner spring 1411. The spiral direction of the outer spring 1412 is opposite to that of the inner spring 1411 immediately adjacent to the outer spring 1412.

The linkage piece 15 is arranged between two adjacent spring parts 14A and 14B for linking the two spring parts 14A and 14B.

When there is only one spring set 141 in each spring part 14A or 14B, all the spring sets 141 may be arranged in series, and the spring sets 141 in adjacent layers are connected by the linkage plate.

In the exemplary embodiments, the comprehensive elastic coefficients of the spring parts 14A and 14B are configured to be different. As such an arrangement, in the process of rebounding the spring unit 14 after nailing, the different accelerations caused by the different rebounding forces of the two spring parts 14A and 14B can cause mutual buffering between the two spring parts 14A and 14B, and reduce the acceleration of rebounding, thereby offsetting partially resilience force. It also reduces the impact force acting on the cylinder body and realizes the effect of vibration reduction. Meanwhile, because the rebound acceleration is reduced, the vibration time of the spring unit is also reduced, thereby ensuring the stability of the nail gun and reducing the labor intensity of the user.

In addition, in the same spring set 141, the spiral directions and loads of the inner spring 1411 and the outer spring 1412 are different, and the generated resonances are not at the same frequency, so that the vibration after nailing can be further reduced, and the comfort after nailing can be further improved.

In one embodiment, as shown in FIG. 18, the spring part disposed near the front side portion 111 is a front spring part 14A, the spring part disposed near the rear side portion 112 is a rear spring part 14B, and the front spring part 14A or the rear spring part 14B has at least two spring sets disposed side by side in parallel and symmetrically distributed around a central extension line of the nail striking member 13

Preferably, the helical direction of the outer spring of each spring part is the same; the spiral directions of the outer springs in the two adjacent spring parts are opposite. For example, the outer springs 1412 of the spring sets in the front spring part 14A have the same spiral direction, and the spiral directions of the outer springs 1412 of the spring sets in the rear spring part 14B are opposite to that of the outer springs 1412 of the spring sets in the front spring part 14A.

Because the helical direction and the load of the springs are different, the generated resonances of the springs are not at the same frequency, thereby greatly reducing the vibration after mailing and improving the comfort level after nailing.

In this embodiment shown in FIG. 18, two parallel spring sets 141A are disposed in the front spring part 14A, and one spring set 141B is disposed in the rear spring part. Two guide rods 16 symmetrically arranged in the cylinder 11, two ends of each guide rod 16 are fixed to the front side portion 111 and the rear side portion 112, respectively, and the piston 12 are movably installed on the guide rods 16. The spring sets 141A of the front spring part are respectively sleeved on the corresponding guide rods 16.

Figure 20:
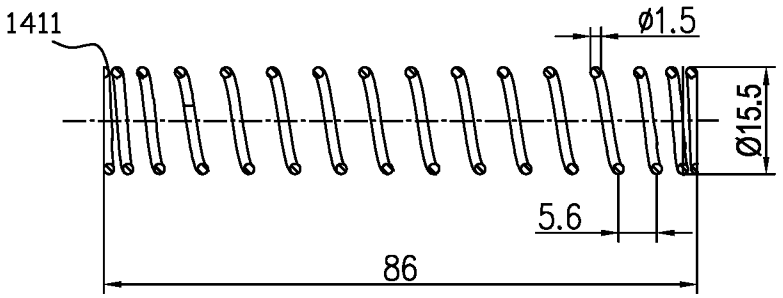
FIG. 20 is a schematic structural view of a spring of a spring unit according to one embodiment of the invention.
Figure 21:
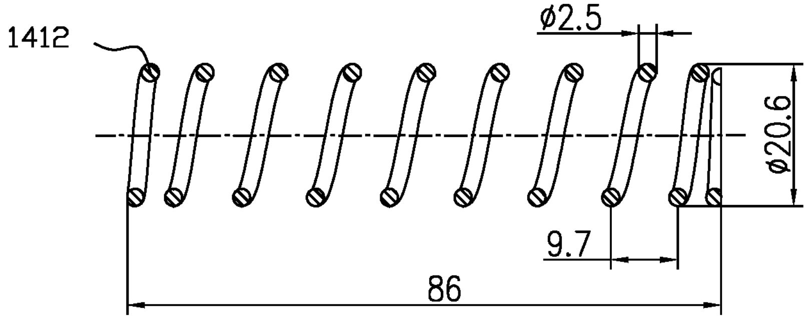
FIG. 21 is a schematic structural view of a spring of a spring unit according to another embodiment of the invention.

FIG. 20 shows the inner spring 1411 having an outer spring diameter of 15.5 mm, a length of 86 mm, a pitch of 5.6 mm, and a wire diameter of 1.5 mm. FIG. 21 shows the outer spring 1412 having a spring outer diameter of 20.6 mm, a length of 86 mm, a pitch of 9.7 mm and a wire diameter of 2.5 mm.

In order to facilitate the mounting with the rear spring part 14B, the linkage piece 15 has a plurality of mounting portions 151 movably arranged on the plurality of guide rods 16 and at least one guiding rod portion 152. In the exemplary embodiment shown in FIG. 6, the mounting portions 151 are two holes having shapes respectively matching the shapes of the guide rods 16, such that the mounting portions 151 are sleeved on the guide rods 16, and abut against one ends of the corresponding front springs 141A of the spring part 14A. The guiding rod portion 152 extends from the center of the rear side of the linkage piece 15, one end of the rear spring 141B of the rear spring part 14B is mounted on the guide rod portion 152, and the other end of the rear spring 141B of the rear spring part 14B is mounted on the rear side portion 112 of the cylinder 11.

As shown in FIG. 18, the arrangement of the inner and outer springs in series is adopted. Under the constant spring force, the springs connected in series share the corresponding force value, which can avoid excessive compression of the spring and prevent premature fatigue of the spring, thereby increasing the life of the springs.

If one spring set is arranged in the front layer spring part, and when two parallel arranged spring sets are arranged in the rear layer spring part, it is only necessary to invert the position of the linkage piece 15 so that one end of the front layer spring part is installed on the guide rod portion 152, the other end of which can be installed on the piston 12.

In order to further improve the vibration damping effect, a front buffer piece 18 is provided between the front spring part and the piston for buffering the vibration of the front spring part; and a rear cushion member 19 is provided between the rear side portion 112 and the rear spring part for cushioning vibration of the rear spring part.

In some embodiments, as shown in FIG. 9, two parallel spring sets 141A are provided in the front spring part 14A, and two parallel spring sets 141B are provided in the rear spring part 14B. The two spring sets 141A of the front spring part 14A and the two parallel spring sets 141B of the rear spring part 14B sleeve respectively on the two guide bars 16, and are linked together by the linkage piece 15, where the linkage piece 15 has only two mounting portions 151 movably arranged on the two guide rods 16.

According to the exemplary embodiments of the invention, the sleeve-type force supply mechanism includes a cylinder 11, a piston 12, a nail striking member 13 and a spring unit 14. The spring unit is freely installed between the piston and the rear side portion of the cylinder. The spring unit has at least two spring sets. Each spring set includes at least one inner spring and an outer spring that sleeves the at least one inner spring inside. The helical direction of the outer spring is opposite to that of the inner spring adjacent to the outer spring. In one embodiment, each spring set is composed of an inner spring and an outer spring. After the inner and outer springs are combined with each other, a larger comprehensive elastic coefficient can be formed in a unit space to supplement greater nailing power and meet the needs of high-power nail guns. In addition, the helical directions of the inner and outer springs are opposite, which can prevent the inner and outer springs from interfering with each other when they are compressed or extended, and reduce the internal energy loss.

In addition, the spring unit may have two spring parts: a front sparing parts disposed near the front side portion, and a rear spring part disposed near the rear side portion. The front spring part and the spring part have different comprehensive elastic coefficients, which can make the spring unit rebound after nailing, and the two spring parts can buffer each other through the different accelerations caused by the different resilience forces of the two different spring parts, so as to reduce the acceleration of the rebound to offset partial resilience force. It also reduces the impact force acting on the cylinder body and realizes the effect of vibration reduction. Meanwhile, because the rebound acceleration is reduced, the vibration time of the spring unit is also reduced, thereby ensuring the stability of the nail gun and reducing the labor intensity of the user.

Embodiment 4: Combined Type of Force Supply Mechanisms

As shown in FIG. 5, the force supply mechanism 1 includes a cylinder 11 set/arranged inside the nail gun, a piston 12 movably disposed in the cylinder 11, a nail striking member 13 co-movably connected to the piston 12 such that the nail striking member 13 operably moves backward and forward through the front end cover 111 of the cylinder 11 in a straight line, and a spring unit 14 disposed in the cylinder 11 and located between the piston 12 and the rear end cover 112 of the cylinder 11 and configured such that an engagement of the nail striking member 13 with the driving member/mechanism 2 causes the piston 12 to move backward in the cylinder 11 to push the spring unit 14 into a contract state so as to store energy therein, and an disengagement of the nail striking member 13 with the driving member 2 causes the spring unit 14 to release the stored energy therein to push the piston 12 to move forward in the cylinder 11 so that the nail striking member 13 is co-moved therewith to strike a nail out of a muzzle 5. In addition, the force supply mechanism 1 also includes a cushioning member 17 disposed between the piston 12 and the front end cover 111 of the cylinder 11 for absorbing shocks caused by striking/firing of the nail striking member 13, a front buffer piece 18 disposed between the piston 12 and the spring unit

14 for operably buffering vibrations of the spring unit 14, and a rear cushion member 19 disposed between the spring unit 14 and the rear end cover 112 of the cylinder 11 for operably cushioning vibration of the spring unit 14.

In some embodiments, the cylinder 11 is made of a metal material, the cylinder 11 has a front side/end portion 111 and a rear side/end portion 112. The front side portion 111 and the rear side portion 112 may be integrally formed at the front and rear ends of the cylinder 11, respectively, or may be separately provided at the front and rear ends of the cylinder 11, respectively. In the exemplary embodiment shown in FIG. 5, the front side portion 111 and the rear side portion 112 of the cylinder 11 is separately provided, that is, a front side portion 111 and a rear side portion 112 are fixed to the front and rear ends of the cylinder 11 by screws. The gun nozzle 5 is mounted on the front side portion 111 of the cylinder 11. It should be noted that in some embodiments, the front side portion 111 and the rear side portion 112 may respectively refer to a front end cover/portion and a rear end cover/portion of the of the cylinder 11.

The cylinder 11 has a plurality of symmetrically disposed guide rods 16 therein, each guide rod 16 has two ends fixed to the front end portion 111 and the rear end portion 112, respectively, and the piston 12 is movably mounted on the plurality of guide rods 16. Specifically, in some embodiments, both of the front end and the rear end of the guide rods 16 are provided with mounting convex columns, the front side portion 111 and the rear side portion 112 are provide with mounting grooves matched with the mounting convex columns in shape, and the guide rods 16 are fixed in the cylinder body 11 through the mounting grooves.

The piston 12 is movably disposed in the cylinder 11. In some embodiments, one or more mounting holes matching the shape of the guide rods 16 are formed on the piston 12, and the piston 12 is movably arranged on the guide rod 16 through the mounting holes. As such, the piston 12 dynamically divides the body of the cylinder 11 into a front chamber and a rear chamber. The nail striking member 13 has a mounting end co-movably connected to the piston 12 and a nailing end extending from the front end portion 111 of the cylinder 11 for striking/firing the nails. Specifically, a mounting post extends from the middle of the front end of the piston 12, and the mounting post is provided with a mounting groove, and the mounting end of the nail striking member 13 is inserted in the mounting groove, and is fixedly connected by a mounting pin. The nailing end of the nail striking member 13 operably moves backward and forward through the front end cover 111 of the cylinder 11 in a straight line and stretches into the firing channel of the gun nozzle 5 for striking the nails.

Figure 22:
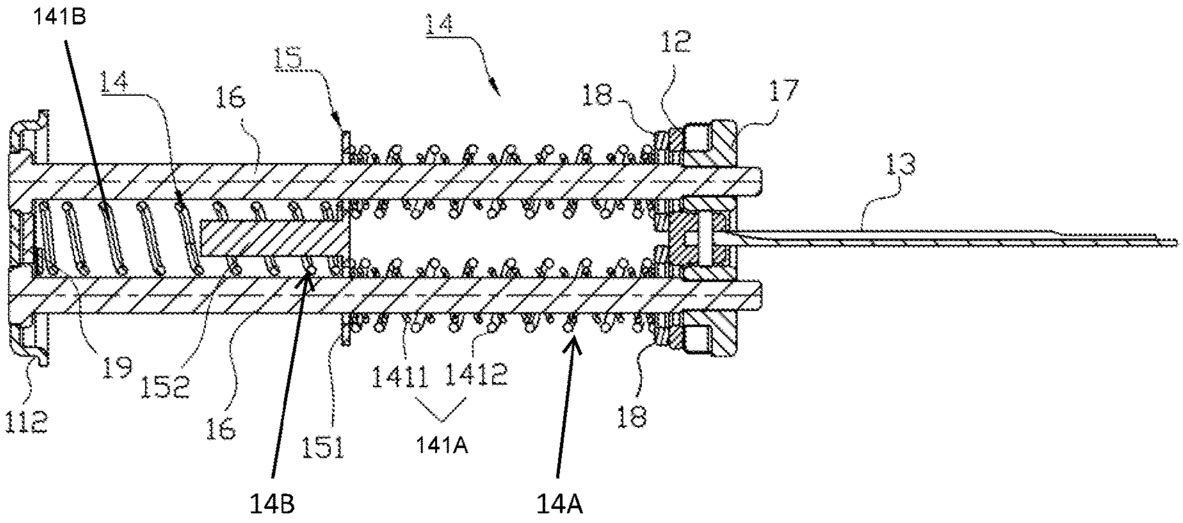
FIG. 22 shows schematically a cross-sectional view of a spring unit according to one embodiment of the invention.

FIG. 22 shows another embodiment of the force supply mechanism of the invention. As shown in FIG. 6, the spring unit 14 has at least two spring parts 14 A and 14B and a link piece 15.

The spring parts 14A and 14B are arranged along the moving direction of the piston 12. Each spring part 14A or 14B has at least one force supplying spring 141. All the force supplying springs 141 in each spring part 14A or 14B are of the same type of springs, and the force supplying springs 141 in two adjacent spring parts 14A and 14B are of different type of springs.

The linkage piece 15 is disposed between two adjacent spring parts 14A and 14B for linking the two spring parts 14A and 14B.

When there is only one force supply spring 141 in each spring part 14A or 14B, all the force supply springs 141 may be arranged in series, and the force supply springs 141 in adjacent spring parts 14A and 14B are combined by the linkage pieces 15.

In some embodiments, the springs in one of the two adjacent spring parts 14A and 14B are a first type of springs and the springs in another of the two adjacent spring parts 14A and 14B are a second type of springs that is different from the first type of springs.

The first and second types of the springs are comprised of two different types of equidistance springs, variable pitch springs, and sleeving springs, and can also be two types of cylindrical springs, conical springs, concave springs, and convex springs.

The type of the springs in this embodiment is determined by the shape, the equidistant or variable pitch/distance, the sleeving manner, and other factors. The length, diameter, and elastic coefficient of the springs do not affect by the type of the springs, that is, the length, diameter, and elastic coefficient of the springs are different, and the springs are regarded as the same type of springs.

The two spring parts are arranged to have a front spring part and a rear spring part disposed respectively near the front side portion and near the rear side portion of the cylinder. The comprehensive elastic coefficients of the front spring part and the rear spring part are different, and the front spring part or the rear spring part is provided with at least two force supply springs which are arranged in parallel and symmetrically distributed around the central extension line of the nail striking member.

In addition, the spiral directions of the force supply springs of each spring part are the same; the spiral directions of the force supply springs in the two adjacent spring parts are opposite. Specifically, the spiral directions of the force supply springs of the front spring part are the same, and are opposite to those of the force supply springs in the rear spring part.

The comprehensive elastic coefficients of the two spring parts are different, which can result in the different resilience forces in the two spring parts in the process of rebounding after nailing, which in turn causes the two spring parts to buffer each other, thereby reducing the acceleration of the rebound and offsetting some of the rebound forces. The impact force acting on the cylinder body is also reduced, and the effect of vibration reduction is realized. At the same time, because the rebound acceleration is reduced, the recoil force is also reduced, making nailing more labor-saving and comfortable.

As shown in FIG. 22, two parallel force supply spring sets 141A are arranged in the front spring part 14A. The force supply spring sets 141A are sleeved springs. One force supply spring 141B is arranged in the rear spring part 14B. The force supply spring 141B is an equidistant spring.

In this embodiment, the two force supply spring sets 141A and two guide rods 16 are provided, and disposed in the inner cavity of the cylinder body 11 from top to bottom. Each force supply spring set is sleeved on a corresponding guide rod 16 and symmetrically distributed around the central extension line of the nail striking member 13. Therefore, when the nail is shot/fired, the resultant force of the force supply springs can be effectively concentrated on the nail striking member 13.

Each sleeved spring includes at least one inner spring 1411 and an outer spring 1412 that internally houses the at least one inner spring 1411. The spiral direction of the outer spring 1412 is opposite to that of the inner spring 1411 immediately adjacent to the outer spring 1412.

In one embodiment, the inner spring 1411 has the outer spring diameter of 15.5 mm, the length of 86 mm, the pitch of 5.6 mm, and the wire diameter of 1.5 mm. The outer spring 1412 has the outer diameter of 20.6 mm, the length is 86 mm, the pitch of 9.7 mm, and the diameter of the spring wire of 2.5 mm.

As shown in FIG. 22, the sleeved spring 141A includes an inner spring 1411 and an outer spring 1422, which are coaxially disposed and sleeved on the same guide rod 16, and increase the overall elastic coefficient of the force-supplying spring in a limited space, so as to generate a larger power for driving the nail. The inner spring 1411 and the outer spring 1422 have opposite spiral directions, so that the two springs are not easily interfered or inclined during compression or extension.

Besides the advantages described above, because of the differences in the spiral direction, quality and stiffness of the springs, the vibration frequencies of the springs in different springs after compressed and released are different, so that the springs cannot resonate, and the impact forces of the springs mutually offset a part, which greatly reduces the vibration after nailing. The vibration reduction effect and the nailing effect thus are improved, and the nailing is more labor-saving and comfortable.

In addition, as shown in FIG. 22, the spring units are arranged in a triangular shape, so that the structure can be more stable.

In order to facilitate the mounting with the rear spring part 14B, the linkage piece 15 has a plurality of mounting portions 151 movably arranged on the plurality of guide rods 16 and at least one guiding rod portion 152. In the exemplary embodiment shown in FIG. 22, the mounting portions 151 are two holes having shapes respectively matching the shapes of the guide rods 16, such that the mounting portions 151 are sleeved on the guide rods 16, and abut against one ends of the corresponding front springs 141A of the spring part 14A. The guiding rod portion 152 extends from the center of the rear side of the linkage piece 15, one end of the rear spring 141B of the rear spring part 14B is mounted on the guide rod portion 152, and the other end of the rear spring 141B of the rear spring part 14B is mounted on the rear side portion 112 of the cylinder 11. Specifically, the force supply spring 141B of the rear spring part 14A is the equidistant spring, and the spiral direction of the equidistant spring 141B is opposite to that of the outer spring 1412 of the front spring part 14A.

In some embodiments, the comprehensive elastic coefficients of the spring parts 14A and 14B are configured to be different. Since the comprehensive elastic coefficients of the spring parts 14A and 14B are different, the spring unit 14 can be rebounded after the nail is shot, and the two spring parts 14A and 14B can cushion each other through the different accelerations caused by the different resilience forces of the two spring parts 14A and 14B, so as to reduce the acceleration of the rebound to offset partial resilience force. It also reduces the impact force acting on the cylinder body and realizes the effect of vibration reduction. Meanwhile, because the rebound acceleration is reduced, the vibration time of the spring unit is also reduced, thereby ensuring the stability of the nail gun and reducing the labor intensity of the user.

In another embodiment, if one force supply spring is arranged in the front spring part 14A and two parallel force supply springs are arranged in the rear spring part 14B, only the position of the linkage piece 15 needs to be reversed, so that one end of the front spring part is installed on the guide rod part 152, and the other end of the front spring part is installed on the piston 12. In order to further improve the vibration damping effect, a front buffer piece 18 is provided between the piston 12 and the front end cover 111 of the cylinder 11 for damping the vibrations of the front spring part 14A; and a rear cushion member 19 is provided between the rear side portion 112 of the cylinder 11 and the rear spring 141B for cushioning vibrations of the rear spring part 14B.

In addition, a cushioning member 17 is provided on the inner wall of the front side portion 111 of the cylinder 11, and the outer edge of the cushioning member 17 abuts against the inner wall of the metal cylinder 11. After nailing, the piston 12 hits the cushioning member 17, the cushioning member 17 contracts, and the impact force is rapidly transmitted to the cylinder 11, thereby achieving rapid transfer and dissipation.

The cushioning member 17, the front buffer piece 18, and the rear cushion member 19 are made of rubber or elastic plastic.

In some embodiments, when the spring set contains multiple inner springs, there are two sleeving types, which are schematically shown in FIGS. 16-17, where FIG. 16 is a schematic structural view of the coaxial arrangement of the spring set of the invention and FIG. 17 is a schematic structural view of a plurality of inner springs symmetrically arranged in the spring set of the invention.

The first sleeving type: the spring set comprises more than two inner springs with different diameters, the inner springs and the outer springs are coaxially arranged, and the spiral directions of the two adjacent inner springs are opposite. As shown in FIG. 16, the spring set includes two inner springs 1411 with different diameters and an outer spring 1412, which are sequentially sleeved on the same guide rod 16 according to the diameters, and the smaller the diameter of the inner spring, the closer the inner spring is to the guide rod 16. The spiral direction of the smallest diameter of the inner springs 1411 is aligned with the same spiral direction of the outer spring 1412, while the spiral direction of the middle inner spring 1411 is opposite to that of the other two springs.

According to the invention, this embodiment of the spring set provides the following advantages:

1. On the premise of not enlarging the cylinder body 11, the comprehensive elastic coefficient of the spring group can be further increased to provide greater nailing power.

2. Through the different settings of the helical directions, the concentric relationship of the sleeving springs can be ensured, and the inner and outer springs can be prevented from skewing or interfering with each other.

3. Due to the difference in the spiral direction, quality and stiffness of the springs, the vibration frequencies of the springs after compressed and released are different, so that the springs cannot resonate, and the impact forces of the springs mutually offset a part, which greatly reduces the vibration after nailing. The vibration reduction effect and the nailing effect thus are improved, and the nailing is more labor-saving and comfortable.

4. In the case of obtaining a certain spring strength, the spring set has the advantages of small size and convenient installation.

The second sleeving type: the spring set comprises an outer spring and a plurality of inner springs with the same diameter, and the inner springs are symmetrically arranged inside the outer spring. As shown in FIG. 17, the spring set includes three inner springs 1411 with the same diameter, and one outer spring 1412. The three guide rods 16 are uniformly distributed in the circumferential direction with the central extension line of the nail striking member 13 as the axis. The inner springs 1411 are connected side by side in parallel and respectively sleeved on the corresponding guide rods 16.

In one embodiment, the spiral direction of two inner springs 1411 is opposite to that of the outer spring 1412, and the spiral direction of the other inner spring 1411 is the same as that of the outer spring 1412.

This embodiment makes full use of the space inside the outer spring 1412, thereby increasing the overall elastic modulus of the spring set.

Compared with the first sleeving type, the inner springs 1411 of the second sleeving type are respectively sleeved on the corresponding guide rods 16, and the positions are relatively fixed, so that the possibility of collision among the springs can be greatly reduced, and the interference among the springs is avoided.

In some embodiments, the force supply spring of at least one of the spring parts is a variable pitch spring. As shown in FIG. 10, the variable pitch spring 142 is also called a pitch spring, that is, the pitch t is different at different positions and different helical angles of the spring.

In some embodiments, the variable pitch spring 142 has at least one pitch variable segment/section/portion 1421, and the pitch t of the pitch variable segment 1421 is gradually increased or decreased.

As shown in FIG. 10, the variable pitch spring 142 has two variable pitch sections 1421, and the two variable pitch sections 1421 are helically formed by the same metal wire. The pitch t of one of the variable pitch sections 1421 decreases gradually, and the pitch t of the other variable pitch section 1421 gradually increases, so that the entire variable pitch spring 142 is in a state where the pitch at middle is small and the pitch at both ends is large.

In order to increase the driving force of the nail, the spring unit 14 also has a plurality of variable pitch springs arranged side by side, and the specification parameters of the variable pitch springs are all the same, and are distributed symmetrically around the central extension line of the nail striking member 13. In order to better realize the deformation of the spring, the variable pitch spring is sleeved on the corresponding guide rod 16.

In some embodiments, when the spring unit 14 has only one variable pitch spring, the guide rod 16 may not be needed, and it can be directly guided by the inner wall of the cylinder body 11 to achieve the same effect.

Since the pitches of the variable pitch spring 142 are different, the generated vibration frequencies are different, which makes the different parts of the variable pitch spring 142 produce different rebound forces after the variable-pitch spring is compressed to store energy, and released to release the stored energy, thereby generating different accelerated speeds that can cause them to buffer each other internally, and reduce the acceleration of the rebound internally, so as to offset partially the rebound force.

Meanwhile, the rebound acceleration is reduced, so that the vibration time of the spring unit is reduced, thereby ensuring the stability of the nail gun, reducing the labor intensity of the user, and improving the nailing effect.

In some embodiments, the variable pitch spring has at least one variable pitch section and at least one equidistant section connected to the at least one variable pitch section, and the pitches of the at least one equidistant section are the same. As shown in FIG. 11, the variable pitch spring 142 has a variable pitch section 1421 and an equidistant section 1422, and the variable pitch section 1421 and the equidistant section 1422 are formed by winding the same metal wire. The pitch t of one of the variable pitch sections 1421 gradually decreases, and the pitches t of the equidistant sections 1422 are all equal.

After the variable-pitch spring is compressed to store energy, and released to release the stored energy, the generated vibration frequencies are different due to different pitches, so that the nailing efficiency is improved.

In some embodiments, the variable pitch spring has at least two equidistant sections with different pitches and a transition section connecting two adjacent equidistant sections, and the pitch of the same equidistant section is the same. As shown in FIG. 12, the variable pitch spring has a first equidistant section 1423, a second equidistant section 1424, and a transition section 1425 connecting the first equidistant section 1423 and the second equidistant section 1424. The first equidistant section 142, the second equidistant section 1424, and the transition section 1425 are formed of the same metal wire. All the pitches of the first equidistant section 1423 are t1, all the pitches of the second equidistant section 1424 are t2, and the pitches t1 of the first equidistant section 1423 are smaller than the pitches t2 of the second equidistant section 1424.

When there are multiple first equidistant segments 1423 and second equidistant segments 1424, the first equidistant segments 1423 and the second equidistant segments 1424 are distributed at intervals and connected by the transition segment 1425.

After the variable-pitch spring is compressed to store energy, and released to release the stored energy, the generated vibration frequencies are different due to different pitches, so that the nailing efficiency is improved.

According to the exemplary embodiments of the invention, the combined type force supply mechanism includes a cylinder, a piston, a nail striking member and a spring unit. The spring unit is freely installed between the piston and the rear side portion of the cylinder. The spring unit has at least two spring parts arranged along the moving direction of the piston 12, and a linkage piece arranged between two adjacent spring parts for linking the two spring parts. Each spring part includes at least one spring. All the springs in each spring part are the same type of springs. The springs in two adjacent spring parts are different types of springs. After the spring parts are combined with each other, a larger comprehensive elastic coefficient can be produced in a unit space to supplement greater nail driving power and meet the needs of high-power nail guns.

In certain embodiments, the springs of the spring parts are sleeving spring. Each sleeving spring includes at least one inner spring and an outer spring that sleeves the at least one inner spring inside. The outer spring is connected to the outer spring. The helical directions of the adjacent inner springs are opposite. In one embodiment, each spring has one inner spring and one outer spring. After the inner and outer springs are combined with each other, a larger comprehensive elastic coefficient can be formed in a unit space to supplement greater nailing power and meet the needs of high-power nail guns. In addition, the helical directions of the inner and outer springs are opposite, which prevents the inner and outer springs from interfering with each other when they are compressed or extended, and reduces the internal energy loss.

In addition, since the comprehensive elastic coefficients of the two spring parts are different, the spring unit can be rebounded after nailing, and the different accelerations caused by the different rebound forces of the two spring parts can result in mutual cushioning, further reducing the acceleration of the rebound, so as to counteract partially the rebound force. The impact force acting on the cylinder body is also reduced, and the effect of vibration reduction is realized. At the same time, since the rebound acceleration is reduced, the vibration time of the spring unit is also reduced, ensuring the stability of the nail gun and reducing the labor intensity of the user.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference.

What is claimed is:

1. A force supply mechanism used for a nail gun, comprising:

a cylinder set inside the nail gun, having a front end cover and a rear end cover;

a piston movably disposed in the cylinder;

a nail striking member co-movably connected to the piston such that the nail striking member operably moves backward and forward through the front end cover of the cylinder in a straight line; and a spring unit disposed in the cylinder and located between the piston and the rear end cover of the cylinder and configured such that an engagement of the nail striking member with a driving member causes the piston to move backward in the cylinder to push the spring unit into a contract state so as to store energy therein, and an disengagement of the nail striking member with the driving member causes the spring unit to release the stored energy therein to push the piston to move forward in the cylinder so that the nail striking member is co-moved therewith to strike a nail out of a muzzle, wherein the spring unit comprises at least one variable pitch spring having at least one variable pitch section; and wherein a pitch of the at least one variable pitch section is gradually increased or decreased.

2. The force supply mechanism of claim 1, wherein the at least one variable pitch spring further has at least one equidistant section connected to the at least one variable pitch section, and the pitches of the at least one equidistant section are the same.

3. A nail gun for nailing, comprising:

the force supply mechanism of claim 1; and a driving member being operably alternatively engaged and disengaged with the nail striking member of the force supply mechanism such that the engagement of the nail striking member with the driving member causes the piston to move backward in the cylinder to push the spring unit into a contract state so as to store energy therein, and the disengagement of the nail striking member with the driving member causes the spring unit to release the stored energy therein to push the piston to move forward in the cylinder so that the nail striking member is co-moved therewith to strike a nail out of a muzzle.

4. A force supply mechanism used for a nail gun, comprising:

a cylinder set inside the nail gun, having a front end cover and a rear end cover;

a piston movably disposed in the cylinder;

a nail striking member co-movably connected to the piston such that the nail striking member operably moves backward and forward through the front end cover of the cylinder in a straight line; and a spring unit disposed in the cylinder and located between the piston and the rear end cover of the cylinder and configured such that an engagement of the nail striking member with a driving member causes the piston to move backward in the cylinder to push the spring unit into a contract state so as to store energy therein, and an disengagement of the nail striking member with the driving member causes the spring unit to release the stored energy therein to push the piston to move forward in the cylinder so that the nail striking member is co-moved therewith to strike a nail out of a muzzle, wherein the spring unit comprises at least one variable pitch spring having at least two equidistant sections with different pitches and a transition section connecting two adjacent equidistant sections, and wherein a pitch of the same equidistant section is same.

5. A nail gun for nailing, comprising:

the force supply mechanism of claim 4; and a driving member being operably alternatively engaged and disengaged with the nail striking member of the force supply mechanism such that the engagement of the nail striking member with the driving member causes the piston to move backward in the cylinder to push the spring unit into a contract state so as to store energy therein, and the disengagement of the nail striking member with the driving member causes the spring unit to release the stored energy therein to push the piston to move forward in the cylinder so that the nail striking member is co-moved therewith to strike a nail out of a muzzle.

6. A force supply mechanism used for a nail gun, comprising:

a cylinder set inside the nail gun, having a front end cover and a rear end cover;

a piston movably disposed in the cylinder;

a nail striking member co-movably connected to the piston such that the nail striking member operably moves backward and forward through the front end cover of the cylinder in a straight line; and a spring unit disposed in the cylinder and located between the piston and the rear end cover of the cylinder and configured such that an engagement of the nail striking member with a driving member causes the piston to move backward in the cylinder to push the spring unit into a contract state so as to store energy therein, and an disengagement of the nail striking member with the driving member causes the spring unit to release the stored energy therein to push the piston to move forward in the cylinder so that the nail striking member is co-moved therewith to strike a nail out of a muzzle, wherein the spring unit comprises at least two spring sets arranged in parallel and distributed symmetrically around a central extension line of the nail striking member, wherein each spring set comprises at least one inner spring and an outer spring that sleeves the at least one inner spring inside, and wherein a helical direction of an inner spring adjacent to the outer spring is opposite to that of the outer spring.

7. The force supply mechanism of claim 6, wherein each spring set comprises two or more inner springs with different diameters, and wherein the inner springs and the outer spring are arranged coaxially, and helical directions of two adjacent inner springs are opposite.

8. The force supply mechanism of claim 6, wherein each spring set comprises a plurality of inner springs has a same diameter, and wherein the plurality of inner springs are symmetrically arranged inside the outer spring.

9. A nail gun for nailing, comprising:

the force supply mechanism of claim 6; and a driving member being operably alternatively engaged and disengaged with the nail striking member of the force supply mechanism such that the engagement of the nail striking member with the driving member causes the piston to move backward in the cylinder to push the spring unit into a contract state so as to store energy therein, and the disengagement of the nail striking member with the driving member causes the spring unit to release the stored energy therein to push the piston to move forward in the cylinder so that the nail striking member is co-moved therewith to strike a nail out of a muzzle.

10. A force supply mechanism used for a nail gun, comprising:

a cylinder set inside the nail gun, having a front end cover and a rear end cover;

a piston movably disposed in the cylinder;

a nail striking member co-movably connected to the piston such that the nail striking member operably moves backward and forward through the front end cover of the cylinder in a straight line; and a spring unit disposed in the cylinder and located between the piston and the rear end cover of the cylinder and configured such that an engagement of the nail striking member with a driving member causes the piston to move backward in the cylinder to push the spring unit into a contract state so as to store energy therein, and an disengagement of the nail striking member with the driving member causes the spring unit to release the stored energy therein to push the piston to move forward in the cylinder so that the nail striking member is co-moved therewith to strike a nail out of a muzzle, wherein the spring unit comprises:

two or more spring parts arranged along a moving direction of the piston; and a linkage piece arranged between two adjacent spring parts for linking the two adjacent spring parts, wherein each of the spring parts comprises at least one spring;

wherein at least one of the spring parts comprises a plurality of springs arranged in parallel and symmetrically distributed around a central extension line of the nail striking member; and wherein all the springs are helical springs.

11. The force supply mechanism of claim 10, wherein helical directions of the springs in each spring part are the same; and wherein the helical directions of the springs in the two adjacent spring parts are opposite.

12. The force supply mechanism of claim 10, wherein at least one of the springs is a variable pitch spring having at least one variable pitch section, or at least two equidistant sections with different pitches and a transition section connecting two adjacent equidistant sections.

13. The force supply mechanism of claim 10, wherein at least one of the spring parts comprises at least one spring set having at least one inner spring and an outer spring that sleeves the at least one inner spring inside; and wherein a helical direction of an inner spring adjacent to the outer spring is opposite to that of the outer spring.

14. The force supply mechanism of claim 10, wherein each spring includes a plurality of sub-springs connected in series.

15. The force supply mechanism of claim 10, wherein each spring is a cylindrical spring, a conical spring, a concave spring, or a convex spring.

16. The force supply mechanism of claim 10, wherein all the springs in each spring part are a same type of springs, and wherein the springs in one of the two adjacent spring parts are a first type of springs and the springs in another of the two adjacent spring parts are a second type of springs that is different from the first type of springs.

17. The force supply mechanism of claim 16, wherein the first type of springs and the second type of springs are respectively composed of two different types of equidistant springs, variable pitch springs, and sleeve springs, and wherein the sleeve spring has at least one inner spring and an outer spring that sleeves the at least one inner spring inside.

18. The force supply mechanism of claim 16, wherein the first type of springs and the second type of springs are respectively composed of two different types of cylindrical springs, conical springs, concave springs, and convex springs.

19. The force supply mechanism of claim 10, wherein the spring parts have a front spring part and a rear spring part respectively disposed in front and rear portions of the cylinder;

wherein the front spring part has a comprehensive elastic coefficient that is different from that of the rear spring part;

wherein a front buffer piece is provided between the piston and the front spring part for operably buffering vibrations of the front spring part; and wherein s a rear cushion member is provided between the rear spring part and the rear end cover of the cylinder for operably cushioning vibration of the rear spring part.

20. The force supply mechanism of claim 10, wherein the spring unit further comprises a plurality of guiding rods central-symmetrically arranged in the cylinder, wherein each guiding rod has a front end and a rear end that are respectively fixed onto the front end cover and the rear end cover of the cylinder;

wherein the piston is movably mounted on the plurality of guiding rods; and wherein at least one of the spring parts comprises the force supply springs with the same number as the plurality of guiding rods, and each force supply spring is respectively arranged on a corresponding one of the plurality of guiding rods.

21. The force supply mechanism of claim 10, wherein the linkage piece includes a plurality of mounting parts movably arranged on the plurality of guiding rods and at least one guiding rod part; and wherein one end of one spring part is mounted on the guide rod part, and the other end of said spring part is mounted on the rear end cover of the cylinder or the piston.

22. A nail gun for nailing, comprising: the force supply mechanism of claim 10; and a driving member being operably alternatively engaged and disengaged with the nail striking member of the force supply mechanism such that the engagement of the nail striking member with the driving member causes the piston to move backward in the cylinder to push the spring unit into a contract state so as to store energy therein, and the disengagement of the nail striking member with the driving member causes the spring unit to release the stored energy therein to push the piston to move forward in the cylinder so that the nail striking member is co-moved therewith to strike a nail out of a muzzle.

* * * * *